US012097512B2

(12) United States Patent
Tussupbayev et al.

(10) Patent No.: US 12,097,512 B2
(45) Date of Patent: Sep. 24, 2024

(54) SYSTEM AND METHOD FOR SATURATION OF A MULTICOMPONENT MEDIUM WITH ACTIVE MICROBUBBLES

(71) Applicant: FineFlot Inc., Toronto (CA)

(72) Inventors: Nessipbay Tussupbayev, Almaty (KZ); Nurzhan Zhantassov, Nur-Sultan (KZ); Aitugan Omarov, Nur-Sultan (KZ); Baurzhan Kassymbergebayev, Nur-Sultan (KZ)

(73) Assignee: FineFlot Inc., Toronto (CA)

( * ) Notice: Subject to any disclaimer, the term of this patent is extended or adjusted under 35 U.S.C. 154(b) by 1107 days.

(21) Appl. No.: 16/903,143

(22) Filed: Jun. 16, 2020

(65) Prior Publication Data

US 2021/0387206 A1 Dec. 16, 2021

(51) Int. Cl.
*B03D 1/16* (2006.01)
*B01F 23/231* (2022.01)
(Continued)

(52) U.S. Cl.
CPC .......... *B03D 1/16* (2013.01); *B01F 23/23121* (2022.01); *B01F 27/2722* (2022.01); *B03D 1/1475* (2013.01); *B03D 1/242* (2013.01)

(58) Field of Classification Search
None
See application file for complete search history.

(56) References Cited

U.S. PATENT DOCUMENTS 2,673,724 A 3/1954 Potts
5,314,644 A 5/1994 Michelsen et al.
(Continued)

FOREIGN PATENT DOCUMENTS

EA 201291019 A1 4/2013
GB 1521785 A 8/1978
(Continued)

OTHER PUBLICATIONS

Trahar, "A rational interpretation of the role of particles size in flotation", International Journal of Mineral Processing, 1981, 8(4): 289-327.
(Continued)

*Primary Examiner* — Peter Keyworth
(74) *Attorney, Agent, or Firm* — BERESKIN & PARR LLP/S.E.N.C.R.L. s.r.l; Tonino Rosario Orsi

(57) ABSTRACT

Several agitators for generating a mixture are described which generally have a housing and an impeller rotatably mounted within the housing. The impeller has a first end with a first end face, and plurality of protuberances and at least one compressed gas channel outlet disposed on the first end face. The agitator also has a mixing chamber that is located adjacent to the plurality of protuberances, a fluid inlet extending through the housing for supplying a mixing fluid to the mixing chamber, and a fluid outlet extending through the housing for discharging the mixture from mixing chamber. When the compressed gas and the mixing fluid are supplied to the mixing chamber, the compressed gas becomes uncompressed gas, and rotation of the impeller agitates the uncompressed gas and the mixing fluid and disperses the uncompressed gas and at least a portion of the mixing fluid to generate the mixture.

31 Claims, 9 Drawing Sheets

(51) Int. Cl.

| | |
|---|---|
| ***B01F 27/272*** | (2022.01) |
| ***B03D 1/14*** | (2006.01) |
| ***B03D 1/24*** | (2006.01) |

(56) References Cited

U.S. PATENT DOCUMENTS

| | | | | |
|---|---|---|---|---|
| 7,922,907 | B2 | 4/2011 | Hassan et al. | |
| 7,997,563 | B2 | 8/2011 | Abe et al. | |
| 8,678,356 | B2 | 3/2014 | Iwaki et al. | |
| 2009/0250395 | A1* | 10/2009 | Aker | C02F 3/1247 210/197 |
| 2010/0181263 | A1* | 7/2010 | Buch | B01F 25/21 210/758 |
| 2010/0207285 | A1* | 8/2010 | Tanaka | B01F 27/25 261/84 |
| 2019/0314776 | A1 | 10/2019 | Metzler | |

FOREIGN PATENT DOCUMENTS

| | | | |
|---|---|---|---|
| JP | 55142535 | A | 11/1980 |
| KZ | 19803 | B | 12/2010 |
| KZ | 4039 | U | 6/2019 |
| RU | 2074117 | C1 | 2/1997 |
| RU | 2254170 | C2 | 6/2005 |
| RU | 2426598 | C1 | 8/2011 |
| RU | 2495724 | C2 | 10/2013 |

OTHER PUBLICATIONS

Rubio et al., “The process of separation of fine mineral particles by flotation with hydrophobic polymeric carrier”, International Journal of Mineral Processing, 1993, 37: 109-112.

Nonaka, “A Wastewater Treatment System Applying Aeration-Cavitation Flotation Mechanism”, Separation Science and Technology, 1986, 21(5): 457-474.

Abramov, “Flotatsionnye metody obogashcheniya” (“Flotation concentration methods”), Moscow: Gornaya Kniga, 2008, vol. 4, relevant pp. 23-25 and 354-362.

Israelachvili et al., “Measurement of Forces between Two Mica Surfaces in Aqueous Electrolyte Solutions in the Range 0-100 nm”, J. Chem. Soc., Faraday Trans.1, 1978, 74: 975-1001.

Wood et al., “How Long Is the Long-Range Hydrophobic Attraction?”, Langmuir, 1995, 11(12): 4797-4802.

Melik-Gaikazyan et al., “Metody resheniya zadach teorii i praktiki flotatsii” (“Methods of the Solving Problems of Flotation Theory and Practice”), Moscow: Gornaya Kniga, 2013, relevant pp. 43-45.

Da Rosa et al., “The FF (flocculation-flotation) process”, Minerals Engineering, 2005, 18(7): 701-707.

Rulyov et al., “Combined Microflotation of Fine Quartz”, Mineral Processing and Extractive Metallurgy, Trans. Inst. Min. Metall. C, 2015, 124(4): 217-223.

Tussupbayev et al., “Microbubble augmented flotation of ultrafine chalcopyrite from quartz mixtures”, Mineral Processing and Extractive Metallurgy, Trans. Inst. Min. Metall. C, 2016, 125(1): 5-9.

Rulyov et al., “Effect of microbubbles as flotation carriers on fine sulphide ore beneficiation”, Mineral Processing and Extractive Metallurgy, Trans. Inst. Min. Metall. C, 2017, 127(3): 133-139.

Tussupbayev et al., “Intensification of flotation of technogenic gold-containing raw materials with the application of a modified foamer”, Ore dressing, 2019, 2: 15-19.

Rodrigues et al., “DAF-dissolved air flotation: Potential applications in the mining and mineral processing industry”, Int. J. Miner. Process., 2007, 82(1): 1-13.

Féris et al., “Advances in the adsorptive particulate flotation process”, Int. J. Miner. Process., 2004, 74(1-4): 101-106.

Jauregi et al., “Colloidal Gas Aphrons: A Novel Approach to Protein Recovery”, Biotechnol. and Bioeng., 1998, 59 (4): 471-481.

Akvola Technologies GmbH, “MICROGAS—Microbubble Generator for Flotation and Gas Transfer”, online brochure, accessed Apr. 16, 2020 <http://www.akvola.com/wp-content/uploads/2018/06/akvola-Technologies-MicroGas_EN_web.pdf>.

Demers, “Enhancing Fine Particle Recovery in Flotation and Its Potential Application to the Environmental Desulphurization Process”, Université du Québec en Abitibi-Témiscamingue, Jun. 2005, pp. 1-46.

* cited by examiner

SYSTEM AND METHOD FOR SATURATION OF A MULTICOMPONENT MEDIUM WITH ACTIVE MICROBUBBLES

FIELD

This application relates to the saturation of a multicomponent medium with active microbubbles. Specifically, the described embodiments relate to a method and an agitator for forming a flotation mixture, which may be used when processing ores and man-made mineral formations.

BACKGROUND

The following is not an admission that anything discussed below is part of the prior art or part of the common general knowledge of a person skilled in the art.

Flotation (floating up, retention on the water surface) is a common method for mineral processing. Flotation is based on a difference in the ability of minerals to hold on an interphase surface in a liquid medium, due to the difference in specific surface energies. During froth flotation, hydrophobic particles may become fixed on air bubbles and carried by them to a pulp surface, forming a layer of mineralized froth, which is a mineral concentrate. During froth flotation, hydrophilic particles remain in the pulp and form a chamber product, i.e., waste (commonly referred to as "tailings").

Known flotation methods have certain limitations in that they can only be used to efficiently extract minerals from feedstock if the particle size is within a narrow range. It has been found that known froth flotation methods have the inability to effectively extract particles of less than 50 microns into the concentrate due to the existing gravitational and hydrodynamic forces.

Since the reserve of coarsely disseminated free-milling ores is depleting, processing increasingly involves finely disseminated refractory ores, and therefore, the requirement to fine grind minerals. The inability to enrich fine classes of mineral particles remains a shortcoming of known flotation processes.

SUMMARY

This section is provided to introduce the reader to the more detailed discussion to follow. This section is not intended to limit or define any claimed or as yet unclaimed subject matter. One or more items of claimed subject matter may reside in any combination or sub-combination of the elements or process steps disclosed in any part of this document including its claims and figures.

In accordance with one aspect of this disclosure, there is provided an agitator for generating a mixture. The agitator may comprise a housing having a first end and a second end, and an impeller that is coupled to a drive shaft and rotatably mounted within the housing. The impeller may have a first end with a first end face, a second end, a sidewall that axially extends between the first and second ends, a plurality of protuberances disposed on the first end face, and at least one compressed gas channel outlet on the first end face of the impeller. The agitator may also comprise a mixing chamber that is located adjacent to the plurality of protuberances, a fluid inlet extending through the housing for supplying a mixing fluid to the mixing chamber, and a fluid outlet extending through the housing for discharging the mixture from the mixing chamber. When the compressed gas and the mixing fluid are supplied to the mixing chamber, the compressed gas may become uncompressed gas and rotation of the impeller may agitate the uncompressed gas and the mixing fluid and may disperse the uncompressed gas and at least a portion of the mixing fluid to generate the mixture.

In at least one embodiment, each compressed gas channel outlet of the at least one compressed gas channel outlet may be located radially inward of each protuberance of the plurality of protuberances.

In at least one embodiment, each compressed gas channel outlet of the at least one compressed gas channel outlet may be located in a central region on the first end face of the impeller.

In at least one embodiment, the plurality of protuberances may be arranged in at least one ring on the first end face.

In at least one embodiment, the fluid inlet may be disposed at the first end of the housing and may supply the mixing fluid to the central region of the first end face of the impeller.

In at least one embodiment, the agitator may further comprise a compressed gas inlet disposed at a sidewall of the housing and extending through the housing.

In at least one embodiment, the impeller may further comprise at least one compressed gas channel connecting the at least one compressed gas channel outlet to a respective one of at least one compressed gas channel inlet on the sidewall of the impeller, the compressed gas inlet may be for supplying compressed gas to the compressed gas channel inlet of each compressed gas channel.

In at least one embodiment, each compressed gas channel of the at least one compressed gas channel may extend from the compressed gas channel inlet to the compressed gas channel outlet along a curved path.

In at least one embodiment, the plurality of protuberances may be between 30 and 200 protuberances.

In at least one embodiment, the plurality of protuberances may be arranged in 4 to 10 concentric rings.

In at least one embodiment, the compressed gas inlet may be a spray nozzle.

In at least one embodiment, the spray nozzle may comprise a non-return valve.

In at least one embodiment, the agitator may further comprise a motor with the drive shaft and a coupling element that couples the drive shaft to the impeller for rotatably driving the impeller.

In at least one embodiment, the mixing fluid may comprise a solution of a multicomponent surfactant and the mixture may comprise gas microbubbles stabilized by a surfactant, emulsion microbubbles stabilized by a surfactant, and/or microdroplets stabilized by a surfactant.

In at least one embodiment, the agitator may further comprise a cooling chamber located intermediate the motor and the housing.

In at least one embodiment, the first end of the housing may comprise an inner front face, defining a portion of the mixing chamber, and the inner front face may comprise a second plurality of protuberances.

In at least one embodiment, the second plurality of protuberances may be arranged in concentric rings.

In at least one embodiment, at least a portion of the first end of the housing may be removable.

In accordance with another aspect of this disclosure, there is provided a flotation system for separating mineral particles from a flow pulp. The flotation system may comprise an agitator having a housing having a first end and a second end, and an impeller that is coupled to a drive shaft and rotatably mounted within the housing. The impeller may have a first end with a first end face, a second end, a sidewall that axially extends between the first and second ends, a plurality of protuberances disposed on the first end face, and at least one compressed gas channel outlet on the first end face of the impeller. The agitator may also comprise a mixing chamber that is located adjacent to the plurality of protuberances, a fluid inlet extending through the housing for supplying a mixing fluid to the mixing chamber, and a fluid outlet extending through the housing for discharging a flotation mixture from the mixing chamber. The flotation system may also comprise a flotation chamber, and a conduit connecting the fluid outlet of the agitator to the flotation chamber.

In at least one embodiment, the conduit may have an inlet disposed upstream of the fluid outlet of the agitator, the inlet being adapted to receive the flow of pulp.

In at least one embodiment, the mixing fluid may be a solution of a multicomponent surfactant and the flotation mixture may comprise gas microbubbles stabilized by a surfactant, emulsion microbubbles stabilized by a surfactant, and/or microdroplets stabilized by a surfactant.

In accordance with another aspect of this disclosure, there is provided a method of producing a flotation mixture having gas microbubbles stabilized by a surfactant, emulsion microbubbles stabilized by a surfactant, and microdroplets stabilized by a surfactant. The method may comprise: (a) providing an agitator having a rotatable impeller, the impeller having a plurality of protuberances extending from a first end face of the impeller into an adjacent mixing chamber; (b) providing a solution of a multicomponent surfactant to the mixing chamber; (c) providing compressed gas to the mixing chamber; and (d) rotating the impeller while the solution of a multicomponent surfactant and the compressed gas are provided, wherein when the compressed gas and the mixing solution are supplied to the mixing chamber, the compressed gas becomes uncompressed gas and rotation of the impeller agitates the uncompressed gas and the mixing solution and disperses the uncompressed gas and at least a portion of the mixing solution to generate the flotation mixture.

In at least one embodiment, the solution of a multicomponent surfactant and the compressed gas may be combined prior to being supplied to the mixing chamber.

In at least one embodiment, the solution of a multicomponent surfactant and the compressed gas may be separately provided to the mixing chamber from opposing directions.

Other features and advantages of the present application will become apparent from the following detailed description taken together with the accompanying drawings. It should be understood, however, that the detailed description and the specific examples, while indicating preferred embodiments of the application, are given by way of illustration only, since changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment of apparatuses, articles, and methods of the present teachings, and which are now described. The drawings are not intended to limit the scope of the teachings described herein.

Figure 1:
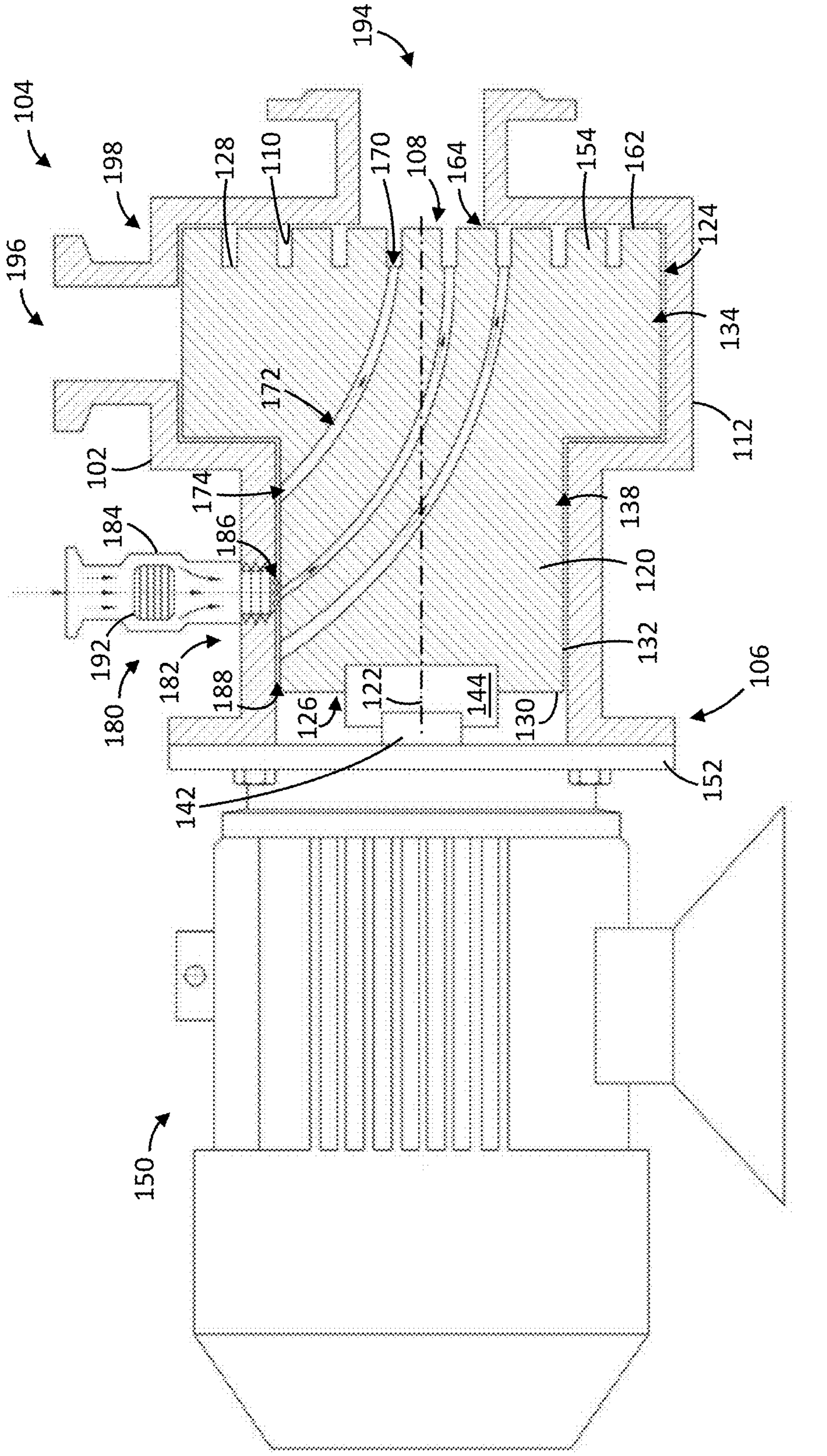
FIG. 1 is a side view of an example embodiment of an agitator in accordance with the teachings herein, where a portion of the agitator is shown as a cross-sectional side view.

Further aspects and features of the example embodiments described herein will appear from the following description taken together with the accompanying drawings.

DETAILED DESCRIPTION

Various apparatuses and methods are described below to provide an example of an embodiment of potentially claimed subject matter. No embodiment described below limits any claimed subject matter and any claimed subject matter may cover apparatuses, components and methods that differ from those described below. The claimed subject matter is not limited to apparatuses and methods having all of the features of any one apparatus or method described below or to features common to multiple or all of the apparatuses or methods described below. It is possible that an apparatus or method described below is not an embodiment of any claimed subject matter. Any subject matter disclosed in an apparatus or method described below that is not claimed in this document may be the subject matter of another protective instrument, for example, a continuing patent application, and the applicant(s), inventor(s) and/or owner(s) do not intend to abandon, disclaim, or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending on the context in which these terms are used. For example, the terms coupled or coupling can have a mechanical or fluidic connotation. For example, as used herein, the terms coupled or coupling can indicate that two elements or devices can be directly connected to one another or connected to one another through one or more intermediate elements or a fluid pathway, depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

As described above, the present teachings relate generally to a method and an agitator for the saturation of a multi-component medium with active microbubbles forming a mixture. In some examples, this mixture (in this case, a flotation mixture) may be used when processing ores of non-ferrous, noble, and rare-earth minerals, as well as man-made mineral formations.

At least one embodiment of the method and the agitator described herein may generate a flotation mixture having the following flotation-active microbubbles stabilized by a surfactant: gas microbubbles (wherein the gas may be, but is not limited to, air, nitrogen, argon, carbon dioxide, oxygen, and any combination thereof), emulsion microbubbles, and microdroplets. For reasons discussed in detail below, this flotation mixture may improve the floatability of fine particles as compared to known flotation systems.

The Agitator

Referring first to FIG. 1, shown therein is an example embodiment of an agitator 100 which may be used to generate a mixture. As shown, the agitator 100 may include a housing 102 having a first end 104 and a second end 106 longitudinally spaced apart from the first end 104. In the example illustrated, the housing 102 defines a mixing chamber 108. Specifically, as shown, inner surfaces 110 of a plurality of walls 112 that make up the housing 102 may define the mixing chamber 108. The mixing chamber 108 may extend within the housing 102 from the first end 104 of the housing 102 to the second end 106 of the housing 102.

Still referring to FIG. 1, as shown, the agitator 100 may include an impeller 120. In the example illustrated, the impeller 120 is rotatably mounted within the housing 102. When in use, the impeller 120 may be rotated about a rotational axis 122 to mix a solution to form a mixture. As shown, the impeller 120 may extend along the rotational axis 122 between a first impeller end 124 and a second impeller end 126. In the example illustrated, the first impeller end 124 includes a first end face 128 and the second impeller end 126 includes a second end face 130. The first end face 128 and the second end face 130 may form opposite distal ends of the impeller 120. As shown, an impeller sidewall 132 may axially extend between the first and second ends 124, 126 of the impeller 120.

In the example illustrated in FIG. 1, the impeller sidewall 132 defines a first portion 134 of the impeller 120 that has a first diameter and a second portion 138 that has a second diameter. As shown, the first end face 128 has a diameter equal to that of the first portion 134 and the second end face 130 has a diameter equal to that of the second portion 138. In the example illustrated, the diameter of the first portion 134 is greater than the diameter of the second portion 138.

Figure 2:
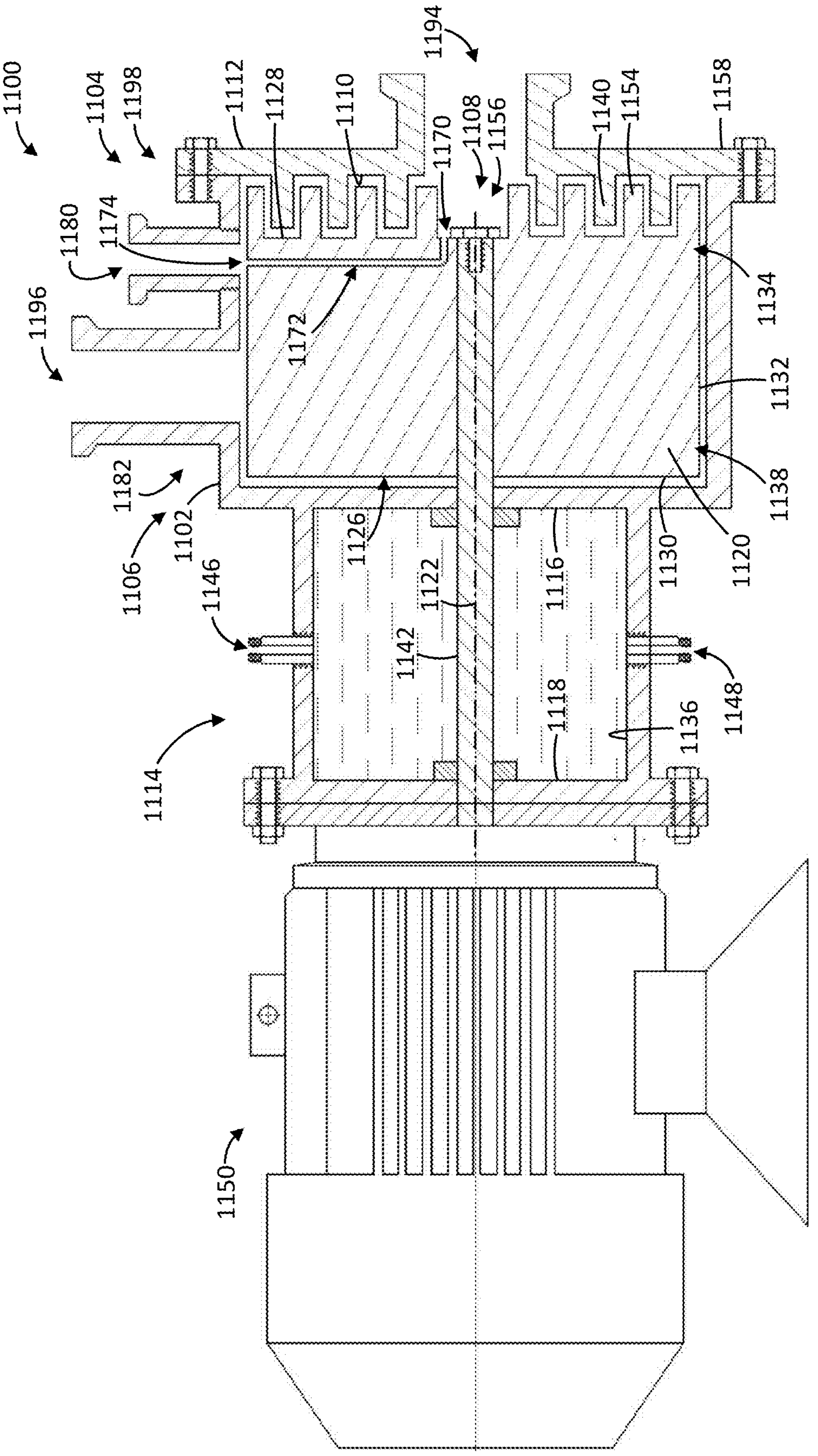
FIG. 2 is a side view of a second example embodiment of an agitator in accordance with the teachings herein, where a portion of the agitator is shown as a cross-sectional side view.

Referring now to FIG. 2, illustrated therein is a side view of a second example embodiment of an agitator 1100. The agitator 1100 is similar to the agitator 100, and like features are marked with reference characters incremented by 1000. Accordingly, features described in reference to agitator 1100 may be applicable to agitator 100, and features described in reference to agitator 100 may be applicable to agitator 1100.

Still referring to FIG. 2, as shown, the first and second portions 1134, 1138 may have an equal diameter. That is, as shown in FIG. 2, the impeller 1120 may be substantially cylindrically shaped, and the surface area of the first end face 1128 may be equal to the surface area of the second end face 1130. In other example embodiments, the diameter of the second portion 138, 1138 may be greater than the diameter of the first portion 134, 1134. In other example embodiments, the impeller 120, 1120 may include at least a third portion that is of greater or lesser diameter to that of the first and/or second end faces. That is, the impeller 120, 1120 may have any longitudinal cross-sectional profile that permits rotation of the impeller 120, 1120 within the housing 102, 1102. In some examples, the impeller 120, 1120 may not have a circular cross-sectional profile. For example, in at least one example embodiment, the impeller 120, 1120 may have a first portion 134, 1134 having a circular cross-section profile and a second portion 138, 1138 having a square shaped cross-sectional profile.

Referring to FIG. 1, in the example illustrated, the second end 126 of the impeller 120 is coupled to a drive shaft 142 disposed at the second end 106 of the housing 102. As shown, a coupling element 144 may be used to join the drive shaft 142 to the impeller second end 126. In at least one example embodiment, a portion of the drive shaft 142 may extend into the second portion 138 along the rotational axis 122, and the drive shaft 142 may be fixed to the second portion 138 by a suitable fastener, such as a bolt that may extend through the impeller sidewall 132 of the second portion 138, and into a portion of the drive shaft 142 located inside the second portion 138. In at least one other example embodiment, the impeller 120 may be coupled to the drive shaft 142 by means of a spline connection (not shown), and translation of the drive shaft 142 with respect to the impeller 120 along the rotational axis 122 may be restricted by a bolt extending through the impeller sidewall 132 of the second portion 138, and into a portion of the drive shaft 142 located within the second portion 138.

The drive shaft 142 may extend through the housing 102 and may be connected to a motor 150 to drive rotation of the drive shaft 142. In at least one example embodiment, the motor 150 may be a 3-phase asynchronous electric motor for general industrial use, from 5.0 to 25.0 kW, 50 Hz, with rotational speed from about 2800 rpm and above. A seal (not shown) may be placed between the housing 102 and the drive shaft 142 to reduce leakage of solution out from the mixing chamber 108 between the drive shaft 142 and the housing 102. In the example illustrated, the drive shaft 142 extends through a removable end wall 152 of the agitator housing 102. It may be desirable for the drive shaft 142 to extend through a removable portion of the housing 102 to facilitate maintenance of the agitator 100, for example, to replace the seal.

In the example illustrated in FIG. 2, the agitator 1100 includes a cooling chamber 1114 positioned between the housing 1102 and the motor 1150. As shown, the cooling chamber 1114 and the housing 1102 may be integrally formed. In other examples, the cooling chamber 1114 and the housing 1102 may be separate pieces. In yet another example, the cooling chamber 1114 may not be positioned between the housing 1102 and the motor 1150, and may be, for example, be positioned proximate the first end 1104 of the housing 1102. Due to the proximity to the mixing chamber, the cooling chamber 1114 may prevent the solution to be mixed and/or the mixture within the mixing chamber 1108 from overheating. Overheating the solution to be mixed and/or the mixture may increase the movement and/or speed of microbubbles within the mixture and, consequently, may increase the likelihood of rapid destruction of the microbubbles. In a preferred embodiment, the temperature of the solution to be mixed and/or the mixture is maintained between about 20 and 30 degrees Celsius.

Still referring to FIG. 2, as shown, the drive shaft 1142 may extend from the motor 1150, through the cooling chamber 1114, and connect to the impeller 1120. In the example illustrated, the cooling chamber 1114 is defined by two end walls 1116, 1118, and a sidewall 1136. In some embodiments, the length of the cooling chamber 1114 along the rotational axis 1122 of the impeller 1120 may be about the same length as the length of the housing 1102 along the rotational axis 1122 of the impeller 1120. In some embodiments, the cooling chamber may be cylindrically shaped, and may have a diameter of about ⅔ the diameter of the first portion 1134 of the impeller 1120. In other embodiments, the cooling chamber may not be cylindrically shaped, and, for example, in at least one embodiment, the cooling chamber may have a square shaped cross-sectional profile. In the example illustrated, the cooling chamber 1114 includes an inlet 1146 and an outlet 1148 to allow coolant, such as, for example, water or antifreeze, to circulate through the cooling chamber. In some examples, a pump may be used to circulate the coolant. Several seals may be used to prevent leakage of coolant out from the cooling chamber and into the mixing chamber 1108 and the leakage of solution from the mixing chamber 1108 into the cooling chamber 1114.

Referring back to FIG. 1, as shown, the impeller 120 may include a plurality of protuberances 154. In the example illustrated, the plurality of protuberances 154 are disposed on the first end face 128 of the impeller 120. Accordingly, in the example illustrated, the mixing chamber 108 is located adjacent to the plurality of protuberances 154. The plurality of protuberances 154 may extend outwardly from the first end face 128 substantially parallel to the mixing axis 122.

Figure 3:
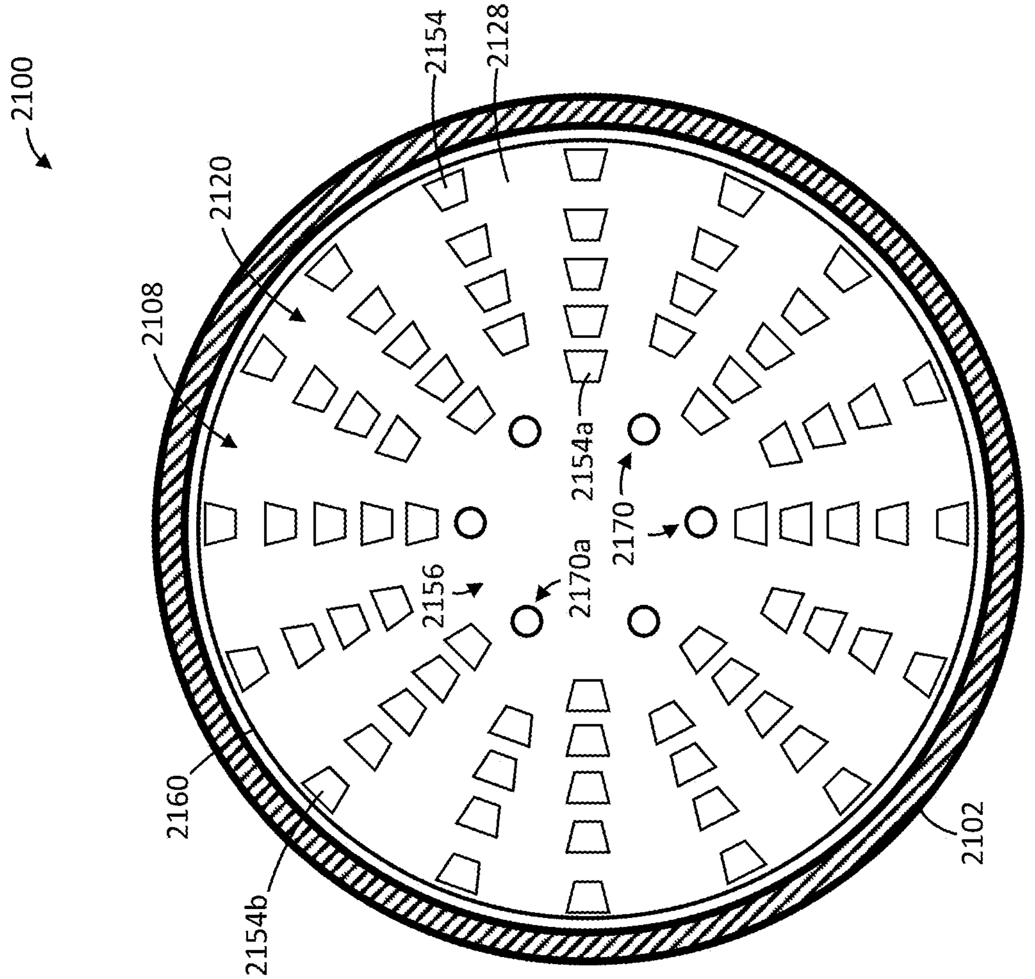
FIG. 3 is a front view of an example embodiment of an impeller, shown disposed within an agitator.

Referring now to FIG. 3, illustrated therein is a front view, i.e. facing the first end face 2128, of a third example embodiment of an impeller 2120. In the example illustrated, the impeller 2120 is rotatably mounted within a housing 2102 of an agitator 2100, a portion of the housing 2102 is not illustrated so that details of the impeller 2120 may be shown. The impeller 2120 is similar to impellers 120, 1120 and like features are marked with reference characters incremented by 2000 (with respect to impeller 120). Accordingly, features described in reference to impeller 2120 may be applicable to impellers 120, 1120, and features described in reference to impellers 120, 1120 may be applicable to impeller 2120. Further, agitator 2100 is similar to the agitator 100, with the exception of the impeller. Agitator 2100 is also similar to the agitator 1100, with differences indicated below. Accordingly, features described in reference to agitator 2100 may be applied to agitators 100, 1100, and vice versa.

In the example illustrated in FIG. 3, the plurality of protuberances 2154 on impeller 2120 are arranged in a pattern that radially extends from a central region 2156 of the first end face 2128 to a circumferential edge 2160 of the first end face 2128. When in use, the plurality of protuberances 2154 may act as mixing blades. In the example illustrated, the impeller 2120 includes seventy-two protuberances 2154 arranged in a pattern of five concentric circles. In other examples, the impellers 120, 1120, 2120 may include a different number of protuberances, for example, between about 30 and about 200 protuberances. Further, in at least one example embodiment, the protuberances may be arranged in any number of concentric circles. In yet another example embodiment, the protuberances may be randomly disposed about the first end face of the impellers 120, 1120, 2120.

Still referring to FIG. 3, as shown, in some examples of the impeller 2120, the protuberances 2154 may have a trapezoidal shaped cross-sectional profile. In other examples, the protuberances 2154 may have, for example, a triangular, crescent, or polygonal shaped cross-sectional profile. In the example illustrated, the cross-sectional profile of the protuberances 2154 is constant amongst the plurality of protuberances 2154. That is, a shape of a first protuberance **2154*a* is the same as a shape of a second protuberance 2154*b*. In other examples, the protuberances 2154 may not all be the same shape and/or size. For example, in at least one example embodiment, the protuberances 2154 nearest the center 2156 of the first end face 2128 may have a greater cross-sectional profile than that of the protuberances 2154 located near the circumferential edge 2160 of the first end face 2128. As shown, the protuberances 2154 may have a constant cross-sectional profile along their length; however, in at least one other example embodiment the cross-sectional profile may vary. For example, in at least one example embodiment, at least a portion of the protuberances 154, 1154, 2154 may have a trapezoidal shaped cross-sectional profile at their base, i.e. at the front face of the impeller 120, 1120, 2120** and may have a pointed peak at their opposite distal end.

Referring back to FIG. 1, as shown therein, it may be desirable to design the housing 102 and the impeller 120 such that a gap 164 between the inner surface 110 of the housing 102 and a distal end 162 of the protuberances 154 is minimized. It has been found that when the gap 164 between the distal ends 162 of the protuberances 154 and the housing 102 is minimal, the quality of a flotation mixture generated within the mixing chamber 108 may be improved. The size of the gap 164 may be determined experimentally in order to produce a mixture that has a desired level of quality depending on the application of the agitator 100.

Referring now to FIG. 2, as shown, in at least one example embodiment, the inner surface 1110 of the housing 1102 facing the first end face 1128 of the impeller 1120 may include a second plurality of protuberances 1140. As shown, the second plurality of protuberances 1140 may be arranged in a pattern that corresponds with the plurality of protuberances 1154 located on the impeller 1120. That is, the second plurality of protuberances 1140 may be interweaved with, i.e., in a mating pattern with the plurality of protuberances 1154 located on the impeller 1120. For example, the plurality of protuberances 1154 of the impeller 1120 may be located to form a first set of concentric rings on the first end face 1128 of the impeller 1120 and the second plurality of protuberances 1140 of the inner surface 1110 of the housing 1102 may be located to form a second set of concentric rings on the inner surface 1110 of the housing so that when the protuberances face one another they do so in an intermingled or interdigitated fashion. In other embodiments, each protuberance of the second plurality of protuberances 1140 may align with a protuberance of the plurality of protuberance 1154. As shown, the second plurality of protuberances 1140 may be arranged about a fluid inlet 1194 extending through the housing 1102, so that a solution to be mixed may be supplied to the mixing chamber 1108. As shown, by including a second plurality of protuberances 1140 on the inner surface 1110 of the housing 1102, since these protuberances are interweaved with the protuberances 1154 of the impeller 1120, the free space that is otherwise available between adjacent protuberances 1154 located on the impeller 1120 may be reduced.

Still referring to FIG. 2, in some embodiments, a front wall 1158 of the housing 1102 may be removable to facilitate maintenance of the impeller 1120 and/or the second plurality of protuberances 1140.

The protuberances 154, 1154, 2154 may be formed by cutting away portions of the impeller 120 using a laser-lathe machine. Accordingly, as shown in FIG. 1, the protuberances 154 and the first and second portions 134, 138 of the impeller 120 may all be formed from a single monolithic work piece. In other examples, each protuberance 154, 1154, 2154 may be adhered, for example welded, to the first end face 128, 1128, 2128 of the impeller 120, 1120, 2120.

Referring back to FIG. 3, in the example illustrated, the impeller 2120 includes at least one compressed gas channel outlet 2170 on the first end face 2128 of the impeller 2120. As shown, the impeller 2120 may include six compressed gas channel outlets 2170. When in use, each compressed gas channel outlet 2170 is used to supply compressed gas to the mixing chamber 2108. When the compressed gas is supplied to the mixing chamber 2108, the compressed gas may decompress and may become uncompressed gas. As shown, each compressed gas channel outlet 2170 may be located in the central region 2156 of the first end face 2128 of the impeller 2120. Further, in at least one example embodiment, each compressed gas channel outlet 2170 may be located radially inward of each protuberance of the plurality of protuberances 2154. That is, a distance between a compressed gas channel outlet **2170*a* and the nearest portion of the circumferential edge 2160 of the first end face 2128 to that outlet 2170*a* may be greater than a distance between any one of the protuberances 2154*a* and the nearest portion of the circumferential edge 2160 of the first end face 2128 to that protuberance 2154*a***.

Referring back to FIG. 1, in at least one example embodiment, the compressed gas channel outlets 170 may be disposed on the first end face 128 amongst the plurality of protuberances 154.

Still referring to FIG. 1, the impeller 120 may include at least one gas channel 172 connecting each of the at least one gas channel outlet 170 to a respective one of a compressed gas channel inlet 174. In the example illustrated, each of the compressed gas channel inlets 174 are located on the impeller sidewall 132. Specifically, as shown, each of the compressed gas channel inlets 174 may be located in the second portion 138 of the sidewall 132. As shown, the compressed gas channels 172 may extend from a respective compressed gas channel inlet 174 to a respective compressed gas channel outlet 170 along a curved path. In other embodiments, there may be a different number of gas channels 172, 1172 and corresponding gas channel inlets 174, 1174 and gas channel outlets 170, 1170, 2170 compared to what is shown in FIGS. 1, 2, and 3.

As shown in FIG. 2, each of the compressed gas channel inlets 1174 may be located in the first portion 1134 of the sidewall 1132. In at least one other example embodiment, each of the compressed gas channel inlets 174, 1174 may be located in a sidewall of the drive shaft 142, 1142. In this example, the compressed gas channel inlets 174, 1174 may be located in a portion of the drive shaft 142, 1142 that is within the mixing chamber 108, 1108 or the cooling chamber 1114. Alternatively, the compressed gas channel inlets 174, 1174 may be located in a portion of the drive shaft 142, 1142 that is outside of the mixing chamber 108, 1108 and the cooling chamber 1114.

As shown in FIG. 1, and as described above, each compressed gas channel outlet 170 may have a respective compressed gas channel 172 extending from a respective compressed gas channel inlet 174. In some examples, the impeller 120 may include only one compressed gas channel inlet 174, and multiple compressed gas channel branches may split off from a single compressed gas channel connected to the compressed gas channel inlet 174 within the impeller 120 and these branches may each connect to a respective compressed gas channel outlet 170.

It has been found that to produce a flotation mixture at a rate of about 10 L/min, between about 3 and 4 L/min of compressed air at a pressure in the range of about 22 psi to about 29 psi may be supplied to the mixing chamber 108. Further, it has been found that six compressed gas channels 172, each having a constant diameter of about 0.2 to 0.4 mm from inlet 174 to outlet 170, are capable of supplying this amount of compressed air to the mixing chamber 108. In other examples, fewer gas channels 172 having a greater diameter may be used to supply compressed gas to the mixing chamber 108; alternatively, more gas channels 172 having a smaller diameter may be used. It may be desirable to include a plurality of smaller compressed gas channel outlets 170 as opposed to one large compressed gas channel outlet 170 to facilitate dispersion of uncompressed gas throughout the mixing chamber 108 at the first end face 128.

Still referring to FIG. 1, in the example illustrated, the agitator 100 includes a compressed gas inlet 180 disposed at a second side portion 182 of the housing 102 for supplying compressed gas to the compressed gas channel inlet 174 of each compressed gas channel 172. As shown, in at least one example embodiment, the compressed gas inlet 180 may include a spray nozzle 184. In the example illustrated, the spray nozzle 184 extends through the housing 102 and includes a plurality of nozzle outlets 186 for discharging compressed gas into the mixing chamber 108. As shown, in at least one example embodiment, there may be a gap 188 between the nozzle outlets 186 and the compressed gas channel inlets 174. Accordingly, when discharging compressed gas into the mixing chamber 108, a portion of the compressed gas may not pass from the nozzle outlets 186 to the compressed gas channel inlets 174. This portion of gas that does not pass through one of the compressed gas channels 172 may pass through the gap 188 between the impeller 120 and the inner surface 110 of the housing 102 and may (a) pass to the first end face 128 and be mixed with the solution by the plurality of protuberances 154; or (b) exit the mixing chamber 108 via a fluid outlet 196, unmixed by the plurality of protuberances 154. A seal (not shown) may be placed between the sidewall 132 and the inner wall 110 of the housing between the compressed gas inlet 180 and the first portion 134 of the impeller 120 to reduce leakage of compressed gas out from the mixing chamber 108 via the fluid outlet 196. In this example, the mixing chamber 108 may be defined by this seal and inner surfaces 110 of the plurality of walls 112 located between this seal and the fluid inlet 194.

As shown in FIG. 2, the compressed gas inlet 1180 may be disposed at the first side portion 1198 of the housing 1102. In other example embodiments, the compressed gas inlet 1180 may be disposed at the first end 1104 of the housing 1102. In this case, compressed gas may be supplied to the mixing chamber 1108 via an additional port (not shown) of the agitator 1100. In at least one example embodiment, such an additional port may be one or more hollow tubes extending through the housing 1102 at the first end 1104, i.e. through the front wall 1158, to the central region 1156 of the first end face 1128 of the impeller 1120. In other example embodiments, the tubes may extend through the fluid inlet 1194 to the central region 1156 of the first end face 1128. In this example, each of the tubes has at least one inlet and one outlet for the compressed gas. In other example embodiments, a compressed gas inlet 180, 1180 may be omitted. In such embodiments, compressed gas may be combined with the flow of the solution prior to being supplied to the mixing chamber 108, 1108.

As shown in FIG. 1, and described above, each compressed gas channel outlet 170 may have a respective compressed gas channel inlet 174 on the impeller sidewall 132. Accordingly, when in use, as the impeller 120 rotates, compressed gas may not be continuously supplied to the compressed gas channel inlets 174. For example, when the impeller 120 is rotated 180 degrees from the position shown in FIG. 1, the compressed gas channel inlets 174 may be on an opposite side of the housing 102 compared to the compressed gas inlet 180. In this position, compressed gas discharged into the mixing chamber 108 may not readily pass to one of the compressed gas channel inlets 174. Accordingly, in at least one example embodiment, the compressed gas channel inlets 174 may be spaced apart such that the compressed gas channel inlets 174 form a ring about the impeller sidewall 132. That is, for an impeller 120 having six compressed gas channel inlets 174, each inlet 174 may be spaced at an equal distance from the second impeller end 126, and may be spaced 60 degrees apart from an adjacent compressed gas channel inlet about the rotational axis 122 of the impeller 120. In this example, compressed gas may be more evenly distributed to the compressed gas channel inlets 174, and the portion of compressed gas that does not pass to the compressed gas channel inlets 174 may be reduced.

In at least one example embodiment, the spray nozzle 184 may include a non-return valve 192. The non-return valve 192 may ensure that no compressed gas may pass from the mixing chamber 108 back into the spray nozzle 184.

Still referring to FIG. 1, in the example illustrated, the agitator 100 includes a fluid inlet 194 disposed at the first end 104 of the housing 102. As shown, the fluid inlet 194 may extend through the housing 102. When in use, a solution to be mixed may be supplied to the mixing chamber 108 via the fluid inlet 194. In the example illustrated, the fluid inlet 194 is axially aligned with the impeller 120 and is proximate to the first end face 128 of the impeller 120. Accordingly, in the example illustrated, the solution to be mixed and the compressed gas enter the mixing chamber 108 from opposing directions.

The agitator 100 may also include a fluid outlet 196 disposed at a first side portion 198 of the housing 102. As shown, the fluid outlet 196 may extend through the housing 102. In some examples of the agitator 100, the fluid outlet 196 may extend through the housing 102, and may extend substantially parallel to the fluid inlet 194. That is, in some examples, the fluid outlet 196 may be disposed at the first end 104 of the housing 102. When in use, the fluid outlet 196 may be used to discharge the solution and uncompressed gas in the form of a mixture from the mixing chamber 108.

The Mixture

To produce a mixture using the agitator 100, a solution to be mixed and compressed gas may each be supplied to the mixing chamber 108 (the examples below are discussed with reference to agitator 100, but agitator 1100 or 2100 may be used). Within the mixing chamber 108, the impeller 120 can create a vortex flow with a high degree of turbulence. Due to the high degree of turbulence, microbubbles may be formed within the mixing chamber 108. These microbubbles and the remaining portion of the solution may then be discharged from the mixing chamber 108 as a mixture. This mixture may be used when processing ores and man-made mineral formations (described in more detail below). Alternatively, this mixture may be used (the following is a non-limiting list of examples): (1) to treat wastewater from oil pollution in the oil and gas industry and wastewater from oil-fat emulsions in the food industry; (2) as a finely dispersed food emulsion when the solution to be mixed is a solution of biologically active compounds and the gas is carbon dioxide or oxygen; (3) in the beauty industry to produce cosmetic microemulsions; (4) in the pharmacological industry for pharmaceutical drug dispersion; and (5) in paint production for pigment dispersion.

In a non-limiting example use of the agitator 100, the solution to be mixed may be an aqueous solution of a multicomponent surfactant consisting of a water-soluble component and an oil soluble component (hereby referred to as a "solution containing a multicomponent surfactant"). Some examples of multicomponent surfactants that may be used include, but are not limited to, dialkyl dithiophosphates, thionocarbamates, xanthates, monobutyl ethers of polyethylene glycols, monobutyl ethers of polypropylene glycols, triethoxybutane, ethoxylated alkyl phenols, and any combination thereof. In other non-limiting examples, the multicomponent surfactant may be prepared using:

(a) a mixture of a water soluble surfactant and an oil soluble surfactant of low molecular weight structure;
(b) a mixture of a water soluble surfactant and an oil soluble surfactant of oligomeric structure;
(c) a mixture of a water soluble surfactant and an oil soluble surfactant of both low molecular weight and oligomeric structure; or
(d) a mixture of a low-molecular-weight water soluble surfactant and an oxidizable water soluble surfactant which may turn into an oil soluble surfactant as a result of aeration with oxygen (i.e., when mixed with compressed gas containing oxygen within the mixing chamber 108).

It has been found that when a solution containing a multicomponent surfactant is mixed with gas, the resulting mixture has both collective and foaming properties. In contrast, in known flotation methods, the main reagents used are separated according to their purpose; i.e., collectors, foaming agents, and modifiers. That is, in known methods, the main reagents are separately added to the pulp, typically in the following order: (a) modifiers; (b) collectors (to enable hydrophobization of the surface of mineral particles); and (c) foaming agents (so that gas bubbles stabilized by surfactants are more firmly fixed on the surface of hydrophobized mineral particles).

Further, it has been found that the number of gas microbubbles in a flotation mixture produced using known methods may be significantly less than may be desired. That is, it has been found that known flotation methods typically produce mixtures that are less than 7% by volume of gas microbubbles, whereas a desired flotation mixture may be 25-30% by volume of gas microbubbles ("by volume" refers to "by volume of gas bubbles produced" not "by volume of total mixture"). Specifically, a desired flotation mixture may comprise 25-30% of large and medium gas bubbles; 35-40% of small gas bubbles; and 25-30% of gas microbubbles (where large bubbles are generally 2-4 mm; medium bubbles are generally 0.2-2 mm; small bubbles are generally 100 μm-1 mm; and microbubbles are generally 40-70 μm). The composition of gas bubbles within the flotation mixture may be very useful to the flotation of mineral particles because each type of bubble serves a different purpose during the flotation process. Specifically, large and medium gas bubbles may be transporting bubbles, small gas bubbles may fix on the surface of flotation-sized mineral particles (>74 microns), and gas microbubbles may attach to fine mineral particles. Large and medium gas bubbles are referred to as transporting bubbles as they may have a greater lifting ability compared to that of small gas bubbles and gas microbubbles, as they contain more gas.

When mixing a solution containing a multicomponent surfactant in the agitator 100, it has been found that a desired mixture, as described above, may be produced. Further, it has been found that when mixing certain formulations of a solution containing a multicomponent surfactant, it may be possible to obtain small gas bubbles of a cascade structure consisting of several gas microbubbles stabilized by a surfactant. These small gas bubbles of a cascade structure may act as transporting bubbles. Due to their relatively small size, the cascades of gas microbubbles stabilized by a surfactant may move faster and may intensify the flotation process, in comparison to conventional large and medium sized transporting bubbles.

Properties of the mixture, such as the number and size of microbubbles may be controlled by changing the formulation of the solution containing a multicomponent surfactant provided to the agitator. Which multicomponent surfactant to use in the solution containing a multicomponent surfactant may be dependent on the characteristics and/or composition of the pulp to be floated. For example, the size of the ore particles within the pulp may dictate which solution containing a multicomponent surfactant to use. Further, the selected multicomponent surfactant may be dependent on the desired ratio of flotation-active gas microbubbles to small gas bubbles of a cascade structure. For example, by increasing in the proportion of water-soluble micelle-forming surfactant in the solution of a multicomponent surfactant, the fraction by volume of gas microbubbles and small gas bubbles of a cascade structure in the composition of the mixture generated by the agitator 100 may increase. By increasing in the proportion of water-soluble surfactant that does not form micelles (for example, methyl isobutyl carbinol) in the solution of a multicomponent surfactant, the fraction by volume of small gas bubbles of a cascade structure in the mixture generated by the agitator 100 may decrease. The proportion of gas microbubbles stabilized by a surfactant and small gas bubbles of a cascade structure in the generated mixture may also depend on the ratio of the volume of water-soluble surfactant and gas supplied to the mixing chamber per unit time. Characteristics of the multicomponent surfactant that may also affect the properties of the mixture, and therefore may dictate which solution containing a multicomponent surfactant to use, include:

(a) the ratio of polar and non-polar groups in the composition of the multicomponent surfactant; and (b) the number of oligomeric groups in the composition of the multicomponent surfactant.

In general, it has been found that when compressed gas and a solution containing a multicomponent surfactant are supplied to the agitator 100, the flotation mixture discharged from the mixing chamber 108 may include the following flotation-active microbubbles stabilized by a surfactant:

(a) gas microbubbles;

(b) emulsion microbubbles; and (c) microdroplets containing an oil soluble surfactant.

It has been found that this flotation mixture has the following effective flotation properties: collective (due to the emulsion microbubbles and microdroplets); foaming (due to the gas microbubbles and their cascades); and aggregating or flocculating fine mineral particles (due to the microdroplets containing an oil-soluble surfactant of oligomeric structure).

Figures 4A, 4B, 4C:
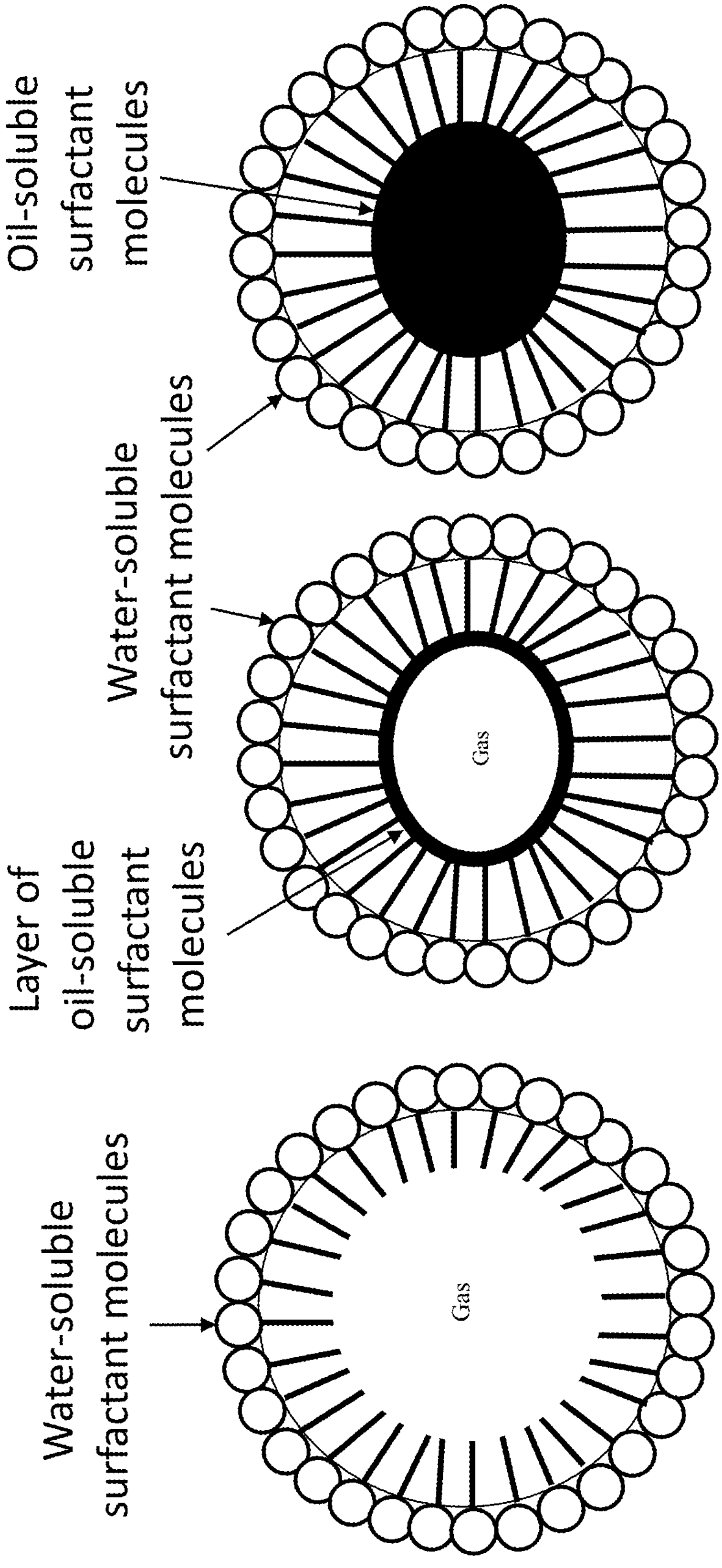
FIG. 4A is a pictorial representation of a gas microbubble stabilized by a surfactant.
FIG. 4B is a pictorial representation of an emulsion microbubble stabilized by a surfactant.
FIG. 4C is a pictorial representation of a microdroplet stabilized by a surfactant.

A schematic diagram of a gas microbubble stabilized by a surfactant is shown in FIG. 4A. Surfactant stabilized microbubbles may be generated due to the dispersion and adsorption processes occurring within the agitator 100 during mixing. Specifically, gas may be dispersed throughout the mixing chamber 108 and surfactant molecules within the solution may adsorb at the water/gas interface. As a result, surfactant stabilized gas microbubbles may be formed. When operating the agitator 100 under typical conditions, described below, various sizes of surfactant stabilized gas microbubbles may be produced. In some examples, a large proportion, for example 60%, of the surfactant stabilized gas microbubbles may be smaller than 50 microns.

During use, within the mixing chamber 108, an oil soluble component of the solution may be broken into a plurality of droplets by the plurality of protuberances 154. A portion of these droplets may acquire sufficient speed for collision and penetration to the non-polar part of a surfactant stabilized gas microbubble by dispersion forces, thereby forming an emulsion microbubble stabilized by a surfactant. Upon penetration, oil-soluble surfactant droplets coalesce to form a layer at the gas/liquid interface. A schematic diagram of an emulsion microbubble stabilized by a surfactant is shown in FIG. 4B. Emulsion microbubbles stabilized by a surfactant may be formed as a result of the penetration of oil-soluble surfactant droplets through partially deformed narrow channels of gas microbubbles stabilized by a surfactant.

The remaining portion of the oil soluble droplets may be stabilized within the mixing chamber 108 by water-soluble surfactant molecules to produce microdroplets stabilized by a surfactant. A schematic diagram of a microdroplet stabilized by a surfactant is shown in FIG. 4C. Under typical operating conditions, these droplets have an average size of around 20 microns. In the example illustrated, the droplets stabilized by water-soluble surfactant molecules include an oil-soluble surfactant structure being of low molecular weight, as well as an oligomeric structure.

It may be desirable to generate a flotation mixture having the following flotation-active microbubbles stabilized by a surfactant: gas microbubbles, emulsion microbubbles, and microdroplets containing an oil soluble surfactant, as this flotation mixture may improve the floatability of fine mineral particles of ores and man-made mineral formations. The manner in which flotation-active microbubbles may interact with mineral particles to lift those mineral particles to a pulp surface is shown in FIG. 5A-5C.

Figure 5A:
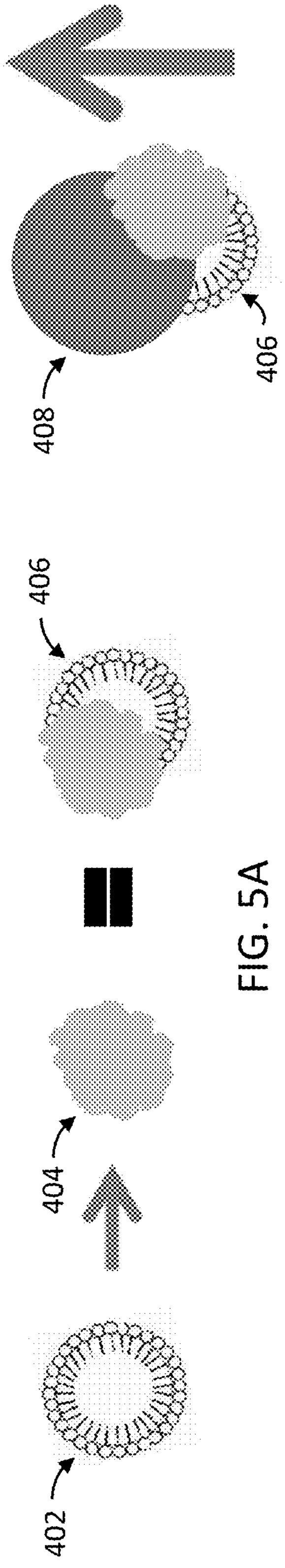
FIG. 5A, is a pictorial representation of the flotation process of fixing a gas microbubble stabilized by a surfactant on the surface of a mineral particle, and further lifting the mineral particle to the pulp surface.

Referring to FIG. 5A, it has been found that a gas microbubble stabilized by a surfactant 402, upon collision with a mineral particle 404, may firmly stick to the surface of that mineral particle 404. This combined gas microbubble and mineral particle 406 may then attach to a transporting bubble 408, which may lift the combined gas microbubble and mineral particle 406 to the pulp surface.

Figure 5B:
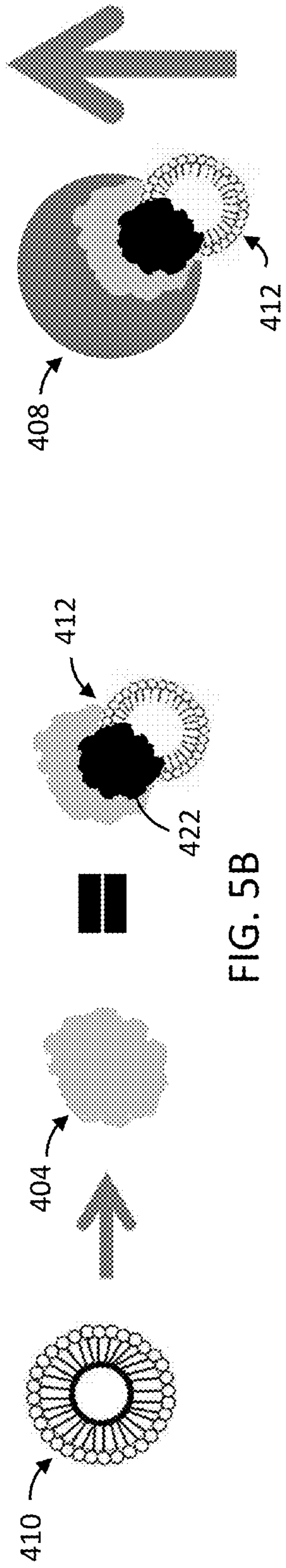
FIG. 5B is a pictorial representation of the flotation process of fixing an emulsion microbubble stabilized by a surfactant on the surface of a mineral particle, and further lifting the mineral particle to the pulp surface.

Referring to FIG. 5B, it has been found that an emulsion microbubble stabilized by a surfactant 410 having the same size as a gas microbubble stabilized by a surfactant 402 may have greater kinetic energy due to the oil-soluble surfactant interlayer therein. As a result, upon collision with a mineral particle 404, the emulsion microbubble 410 may more efficiently decrease that mineral particle's hydration shell thickness down to the critical value required to fixate the emulsion microbubble 410 on the surface of that mineral particle 404. Simultaneously, a layer of oil-soluble surfactant 422 from the emulsion microbubble 410 may distribute over the surface of that mineral particle 404, thus making that mineral particle 404 more hydrophobic and, as a result, the adhesion between the emulsion microbubble 410 and that mineral particle 404 may increase (an emulsion microbubble 410 is essentially a gas microbubble 402 following distribution of the oil-soluble surfactant 422 over the surface of the mineral particle 404). This combined emulsion microbubble and mineral particle 412 may then attach to a transporting bubble 408 and be lifted to the pulp surface.

Figure 5C:
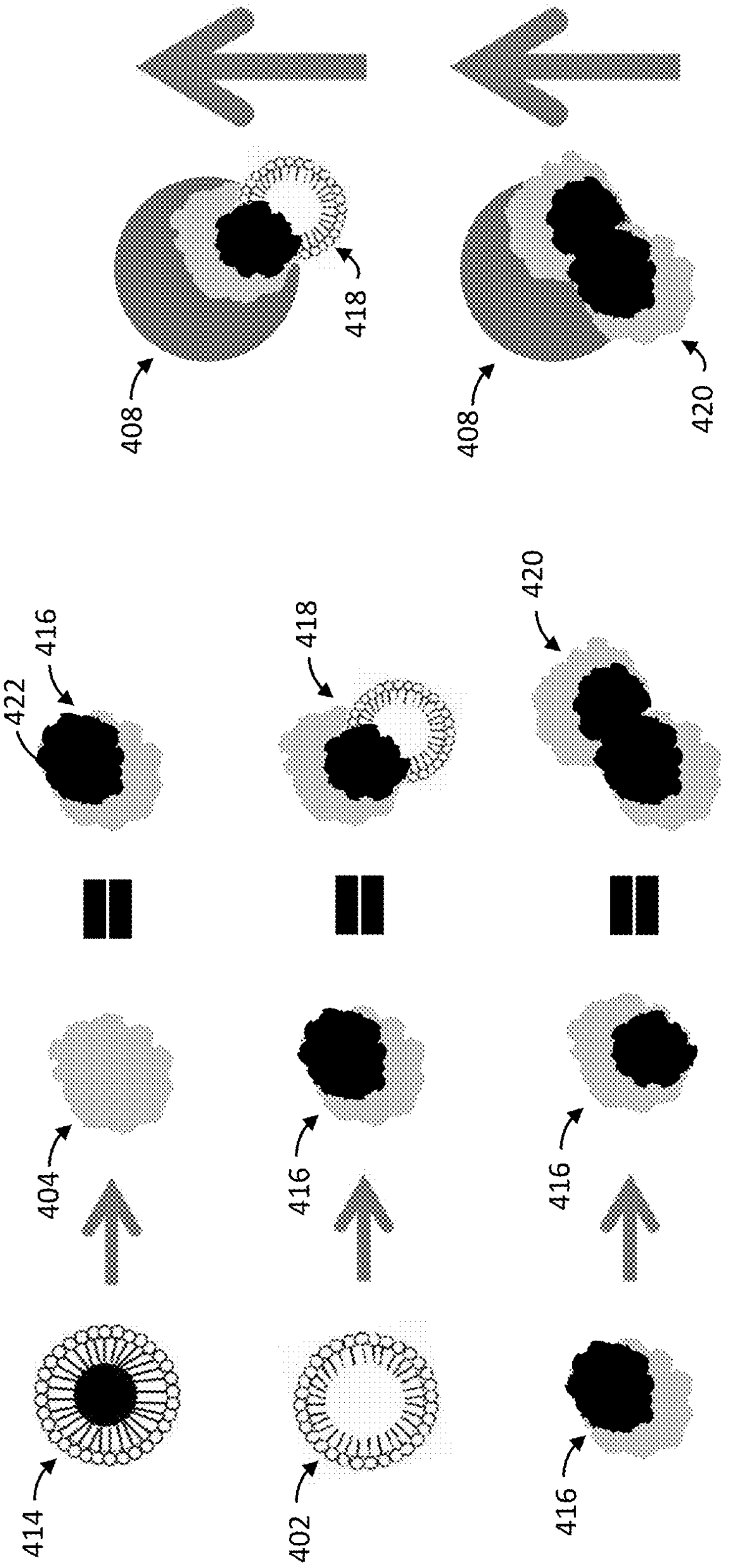
FIG. 5C is a pictorial representation of the flotation process of the distribution of a microdroplet stabilized by a surfactant over the surface of a mineral particle, the aggregation of fine mineral particles, and further lifting of the mineral particles to the pulp surface.

Referring now to FIG. 5C, it has been found that a microdroplet stabilized by a surfactant 414, upon collision with a finely dispersed mineral particle 404, may also thin the hydration shell of that mineral particle 404 and may distribute oil-soluble surfactant 422 over the surface of that mineral particle 404 (i.e., may form an oil-soluble surfactant covered mineral particle 416). That is, collision of microdroplets 414 and mineral particles 404 may increase the degree of hydrophobicity of those mineral particles 404. Accordingly, a flotation-active microemulsion containing microdroplets 414 of an oil-soluble surfactant may improve flotation because gas microbubbles 402 may more readily stick to oil-soluble surfactant covered mineral particles 416 (forming a combined gas microbubble and oil-soluble surfactant covered mineral particle 418). This combined gas microbubble and oil-soluble surfactant covered mineral particle 418 may then attach to a transporting bubble 408, which may lift the combined gas microbubble and oil-soluble surfactant covered mineral particle 418 to the pulp surface. Further yet, the microdroplets 414 of an oil-soluble surfactant of an oligomeric structure may also act as a hydrophobic flocculant, which may lead to aggregation (420) of oil-soluble surfactant covered fine mineral particles 416, and an increase in collision efficiency with gas bubbles 402, 408, which, in turn, may intensify flotation.

Accordingly, as will be described in detail below, it may be desirable to combine this flotation mixture with pulp having fine mineral particles therein in a flotation chamber to separate the fine mineral particles from the pulp.

Flotation of Finely Dispersed Mineral Particles and Man-Made Mineral Formations

A typical flotation process includes three stages: roughing, cleaning, and scavenging. During the roughing stage, pulp may be separated into a rougher concentrate having a maximum amount of mineral particles therein and rougher tailings. According to the principles described above, the agitator 100 (or 1100, 2100) may be used to produce a flotation mixture to be used during the roughing stage. During the cleaning stage, the rougher concentrate from the roughing stage may be further processed to remove undesirable particles and thereby increase the concentration of valuable minerals. During the scavenging stage, the rougher tailings may be further processed to recover desirable mineral particles that were not separated into the rougher concentrate. Again, according to the principles described above, the agitator 100 (or 1100, 2100) may be used to produce a flotation mixture to be used during the cleaning and scavenging stages. Further, it should be noted that flotation systems may be quite complex, and may include several roughing, cleaning, and scavenging steps, and various options for the enrichment of flotation products, which can be returned to various process stages or processed separately.

Figure 6:
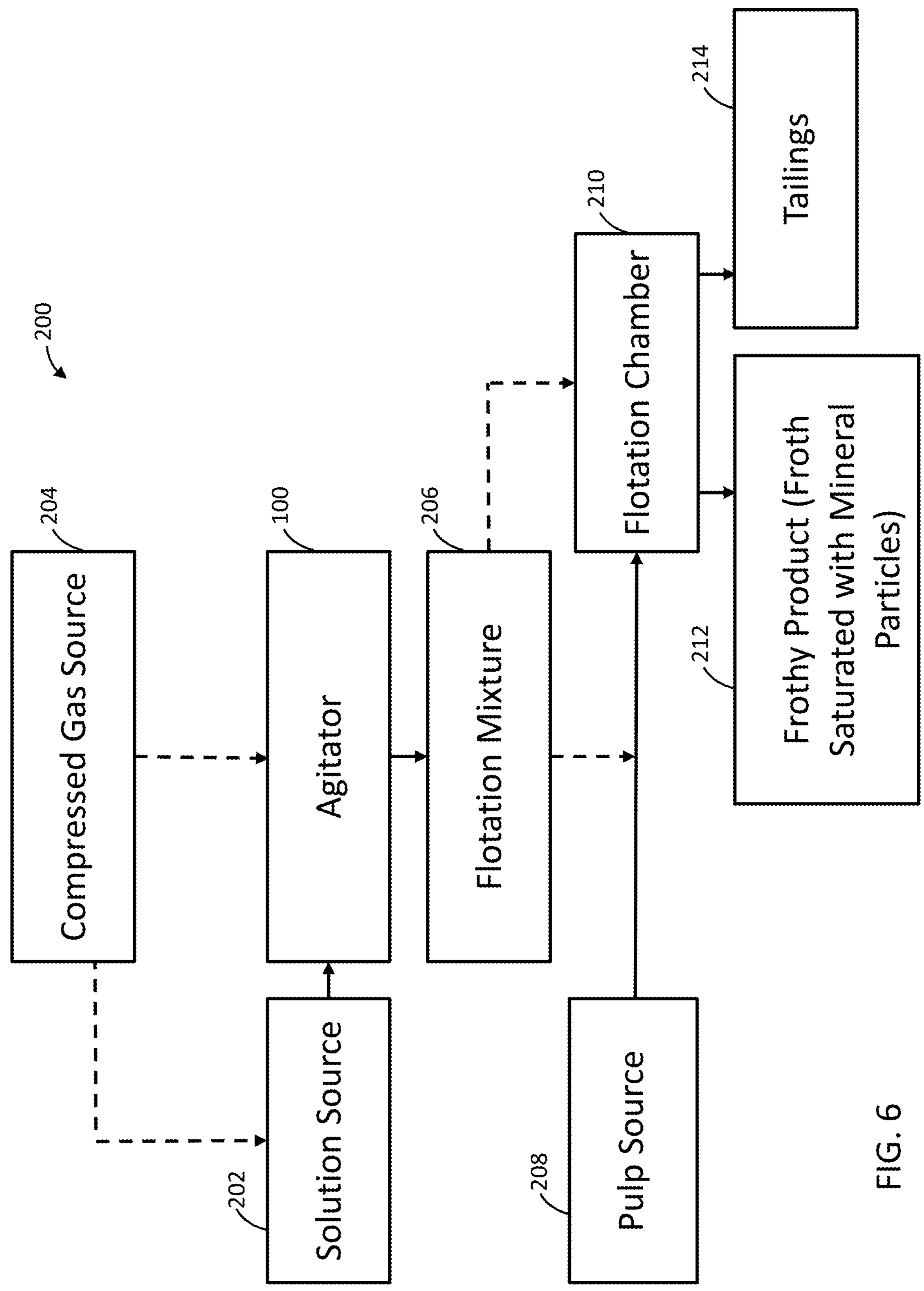
FIG. 6 is a schematic diagram of an example embodiment of a flotation system that employs an embodiment of the agitator described herein.

Referring now to FIG. 6, shown therein is a schematic diagram of a flotation system 200. In the example illustrated, the system 200 includes a solution source 202, a compressed gas source 204 and the agitator 100 (the examples below are discussed with reference to agitator 100, but agitator 1100 or 2100 may be used). As described above, the agitator 100 may be used to generate a flotation mixture 206 from the solution and the compressed gas. As shown, the system 200 may also include a pulp source 208. The system 200 may also include a flotation chamber 210 that is in fluid communication with the agitator 100. In the example illustrated, the flotation chamber is used for roughing flotation. That is, within the flotation chamber 210, a flotation mixture 206 having flotation-active microbubbles therein, i.e., gas microbubbles stabilized by a surfactant 402, emulsion microbubbles stabilized by a surfactant 410, and microdroplets stabilized by a surfactant 414, may interact, as described above, with the pulp to separate the mineral particles into the frothy product 212 and the tailings 214. In at least one example embodiment, the flotation chamber 210 and the pulp source 208 may be components of a pre-existing flotation system, and the agitator 100 may be added to that pre-existing system. Further, in at least one example embodiment, the flotation system 200 may include more than one agitator 100 and/or more than one flotation chamber 210. For example, two agitators 100 may be connected to one flotation chamber 210 from two opposite sides to inject microbubbles more evenly throughout the flotation chamber. In at least one other example embodiment, the flotation system 200 may include three flotation chambers 210 and two agitators 100. In this example, the tailings produced in the first flotation chamber 210, can be fed into the second flotation chamber 210 for additional flotation (i.e., roughing or scavenging flotation), and then into the third flotation chamber 210 for the final flotation (i.e., scavenging flotation). In this example the first agitator 100 may be connected to the second flotation chamber 210, and the second agitator 100 may be connected to the third flotation chamber 210. As noted above, in some examples embodiments, there may be any number of chambers for roughing, cleaning, and scavenging.

Further, the system 200 may include equipment not shown in FIG. 6. For example, in at least one example embodiment of the flotation system 200, a compressor may be provided to compress the gas before it is supplied to the agitator 100 (i.e., the compressed gas source 204 may include a compressor). In at least one example embodiment of the flotation system 200, a vessel may be provided for preparing the solution before it is supplied to the agitator 100 (i.e., the solution source 202 may include a vessel). In at least one example embodiment of the flotation system 200, a pump may be provided for supplying the solution to the agitator 100 from the solution source. In at least one example embodiment of the flotation system 200, valves may be installed at the fluid inlet 194 and fluid outlet 196 of the agitator 100 to adjust the volume of fluid flow to/from the agitator 100.

Figure 7:
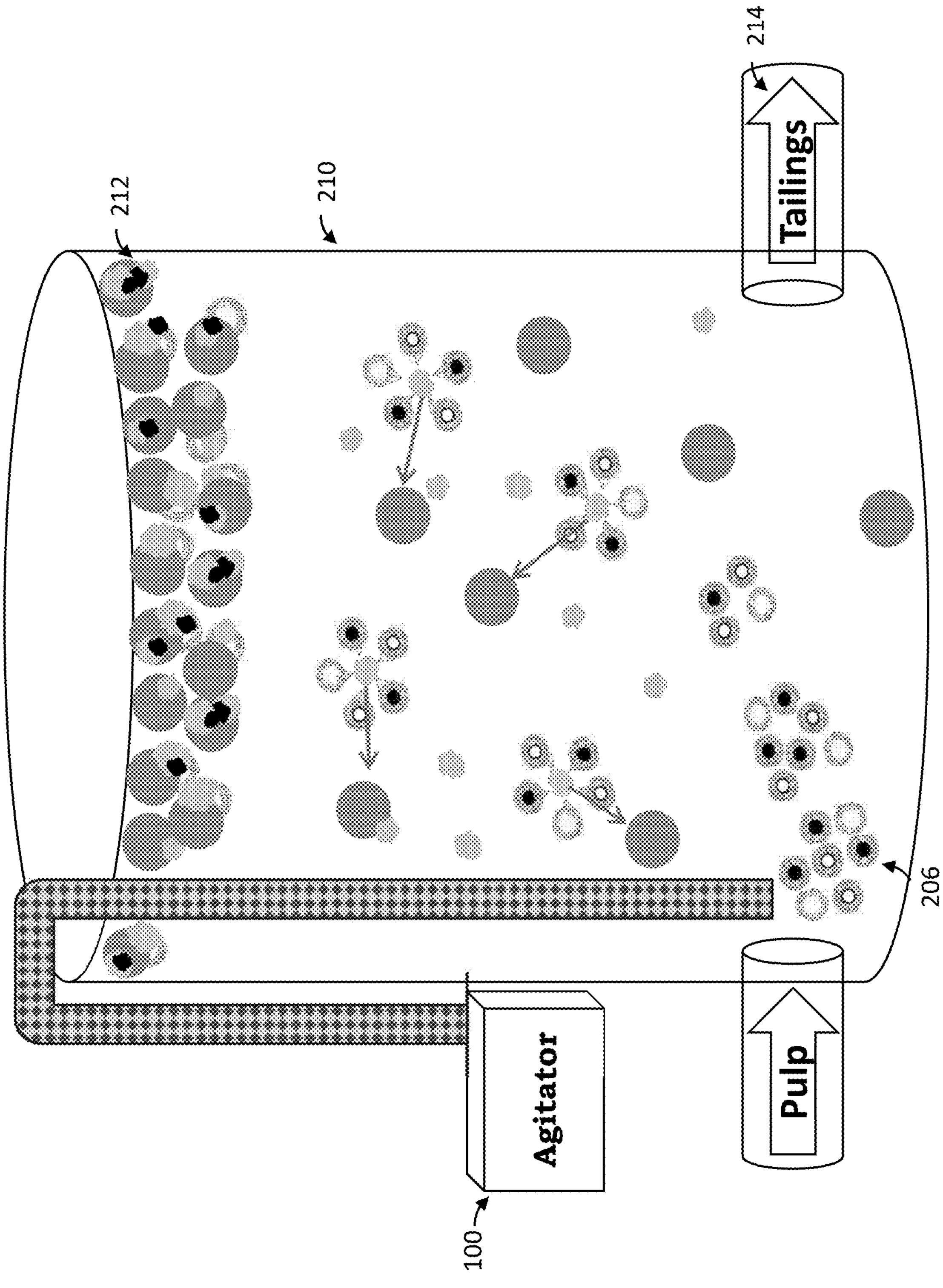
FIG. 7 is a schematic diagram of a second example embodiment of a flotation system that employs an embodiment of the agitator described herein.

Still referring to FIG. 6, in the example illustrated a series of conduits (represented by arrows) may be used to connect the various components of the system 200. As shown, in some examples of the system 200, the flotation mixture 206 generated by the agitator 100 may be supplied directly to the flotation chamber 210, such as is in the system shown in FIG. 7. In other examples of the system 200, the flotation mixture 206 may be combined with the flow of pulp from the pulp source 208 prior to being supplied to the flotation chamber 210. As shown, in at least one example embodiment of the system 200, compressed gas may be supplied directly to the agitator 100. Alternatively, in at least one other example embodiment of the system 200, compressed gas may be combined with the flow of solution from the solution source 202 prior to being supplied to the agitator 100.

Figure 8:
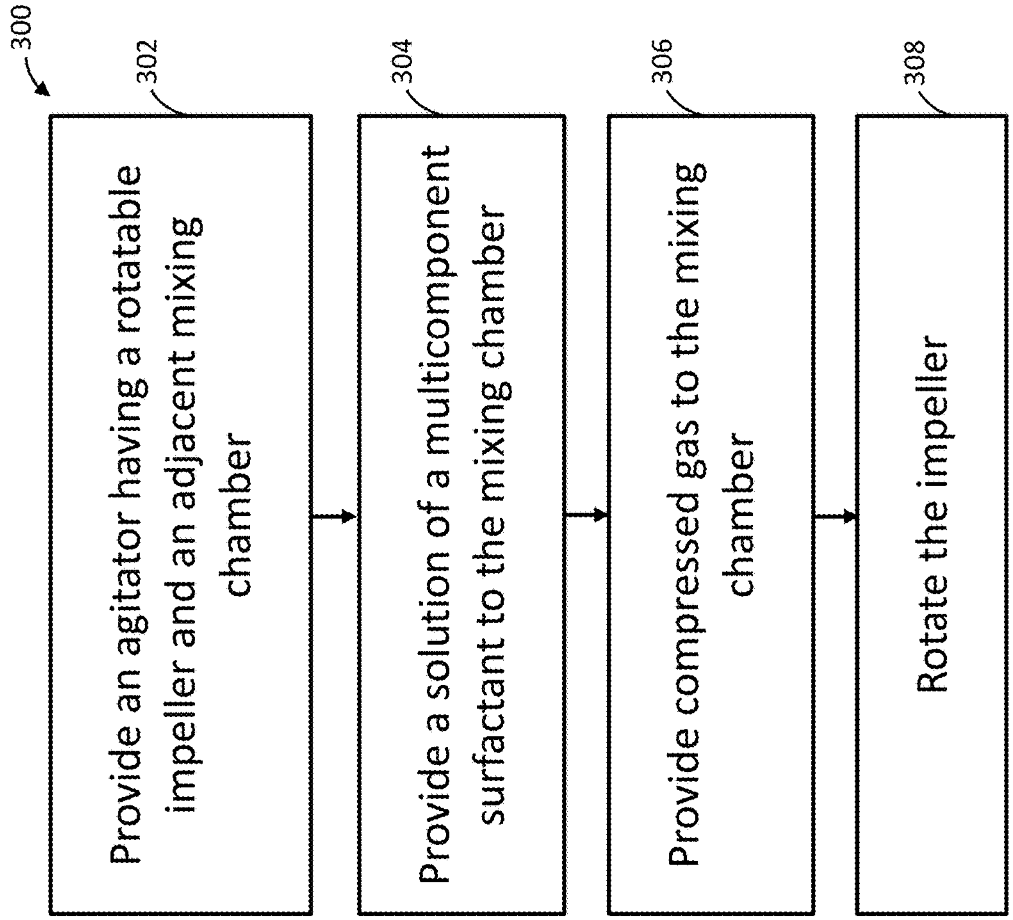
FIG. 8 shows a flow chart of an example embodiment of a method for generating a flotation mixture in accordance with the teachings herein.

Referring now to FIG. 8, shown therein is a flow chart outlining an example embodiment of a method 300 for generating a flotation mixture. The method 300 is a method for producing a mixture having the following flotation-active microbubbles stabilized by a surfactant: gas microbubbles, emulsion microbubbles, and microdroplets. As shown, the method 300 may start at step 302, wherein an agitator is provided. The agitator is similar to agitator 100 and includes a rotatable impeller, the impeller having a plurality of protuberances extending from a first end face of the impeller into an adjacent mixing chamber. In at least one other example embodiment, step 302 may include providing the agitator 100.

Still referring to FIG. 8, at step 304 a solution of a multicomponent surfactant is provided to the mixing chamber of the agitator provided in step 302. Next, at step 306 compressed gas is provided to the mixing chamber via the compressed gas channel outlets in the impeller of the agitator provided in step 302. When the compressed gas is supplied to the mixing chamber, the compressed gas may become uncompressed gas. In at least one example embodiment, step 304 and step 306 may be performed conterminously. In at least one other example embodiment, step 304 may follow step 306, or vice versa.

As shown, once the solution of a multicomponent surfactant and the compressed gas are provided to the agitator, at step 308 the impeller of the agitator may be rotated. Rotating the impeller while the solution of a multicomponent surfactant and the compressed gas are provided, may agitate the uncompressed gas and the mixing solution and may disperse the uncompressed gas and at least a portion of the mixing solution to generate the flotation mixture. In some examples, steps 304, 306, and 308 may all be performed conterminously. That is, is some examples of the method 300, the impeller may be constantly rotated for a period of time, and during this period, the solution or a multicomponent surfactant and the compressed gas may be continuously supplied to the mixing chamber at an appropriate rate.

In at least one example embodiment, between 8,000 and 10,000 L/hour of aqueous solution of a multicomponent surfactant, and between 3,500-4,500 L/hour of compressed air at a pressure in the range of from about 22 psi to about 29 psi may be supplied to the agitator 100. In at least one example embodiment, to mix and disperse the compressed air and the multicomponent surfactant, the impeller may be rotated between 2,800 and 3,000 rotations per minute. A motor may be used to drive the impeller.

EXPERIMENTAL DATA

A series of experiments were conducted to test the following:

(a) the ability of the agitator 100 to produce a flotation mixture having the following flotation-active microbubbles stabilized by a surfactant: gas microbubbles, emulsion microbubbles, and microdroplets containing an oil soluble surfactant when supplied with an aqueous solution of a multicomponent surfactant and compressed air; and (b) whether the flotation mixture produced in (a) increases floatation of fine mineral particles.

The tests were also used to determine features of the flotation mixture produced in (a), such as the size of the generated microbubbles.

Experiment 1

Flotation tests (i.e., test 1—basic mode; and test 2—with the method described herein, see Table 1 below) on refractory gold-containing ore were carried out in kinetic mode on a Mechanobr Technika FL-240 flotation machine with a chamber volume of 3 decimeter cubed using a Flotanol C-7 foaming agent. For the basic mode test, aqueous solutions of the $Pb(NO_3)_2$, Butyl xanthate, and Flotanol C-7 agents (i.e., modifiers, collectors, and foaming agents) adopted at a mineral processing factory during industrial flotation were fed directly to the Mechanobr Technika FL-240 flotation machine. For the test according to the method described herein, the same aqueous solutions of the agents as used for the basic mode test, excluding the Flotanol C-7 foaming agent, were fed directly to the Mechanobr Technika FL-240 flotation machine, and an aqueous solution of the Flotanol C-7 foaming agent was fed into the mixing chamber of an agitator 100 to generate a flotation mixture containing the following microbubbles stabilized by surfactant: air microbubbles, emulsion microbubbles, and microdroplets. This flotation mixture was then supplied into the Mechanobr Technika FL-240 flotation machine. The flotation results are shown in Tables 1 and 2, below.

TABLE 1

Results of flotation of refractory gold ore in kinetic mode using Flotanol C-7 foaming agent

| Products | Output, % | Content of Au, g/t | Extraction of Au, % | Comments |
|---|---|---|---|---|
| Concentrate, 16 min. | 8.06 | 14.08 | 60.38 | Basic mode: $Pb(NO_3)_2$ - 70 g/t, |

TABLE 1-continued

Results of flotation of refractory gold ore in kinetic mode using Flotanol C-7 foaming agent

| Products | Output, % | Content of Au, g/t | Extraction of Au, % | Comments |
|---|---|---|---|---|
| Tailings | 91.94 | 0.81 | 39.62 | Butyl xanthate-150 g/t, |
| Feed | 100.00 | 1.9 | 100.00 | Flotanol C-7, 7 g/t |
| Concentrate, 16 min. | 7.89 | 15.14 | 64.31 | With the method described herein: |
| Tailings | 92.11 | 0.72 | 35.69 | $Pb(NO_3)_2$ - 70 g/t, |
| Feed | 100.00 | 1.9 | 100.00 | Butyl xanthate-150 g/t, Flotanol C-7, 7 g/t |
| Concentrate, 16 min. | 10.36 | 13.50 | 69.32 | With the method described herein: |
| Tailings | 89.64 | 0.69 | 30.68 | $Pb(NO_3)_2$ - 70 g/t, |
| Feed | 100.00 | 2.0 | 100.00 | Butyl xanthate-150 g/t, Flotanol C-7, 10 g/t |

As shown, under the basic mode with Flotanol C-7 foaming agent (consumption 7 g/t), 8.06% of gold-containing concentrate with a gold content of 14.08 g/t was obtained with 60.38% recovery. When using the method described herein, 7.89% of gold-containing concentrate with a gold content of 15.14 g/t was obtained with a recovery of 64.31%. That is, gold recovery was increased by 3.93% without compromising the quality of the concentrate.

When using the method described herein with increased consumption of Flotanol C-7 to 10 g/t, 10.36% of gold-containing concentrate with a gold content of 13.50 g/t was obtained with a recovery of 69.32%. That is, gold recovery was increased by 8.94% compared with the basic mode with 7 g/t consumption of Flotanol C-7.

TABLE 2

Granulometric composition of the tailings of flotation in kinetic mode

| Size grade, mm | Output, % | Content of Au, g/t | Distribution of Au, % of product |
|---|---|---|---|
| Tailings (Basic mode, $Pb(NO_3)_2$ - 70 g/t, Butyl xanthate - 150 g/t, Flotanol C-7- 7 g/t) | | | |
| +0.14 | 3.42 | 1.24 | 5.22 |
| −0.14 + 0.071 | 20.23 | 1.24 | 30.87 |
| −0.071 + 0.040 | 30.92 | 0.53 | 20.22 |
| −0.040 + 0.025 | 21.51 | 0.54 | 14.42 |
| −0.025 + 0 | 23.92 | 0.99 | 29.27 |
| Total | 100.0 | 0.81 | 100 |
| Tailings (Using the method described herein, $Pb(NO_3)_2$-70 g/t, Butyl xanthate - 150 g/t, Flotanol C-7- 10 g/t) | | | |
| +0.14 | 4.85 | 1.61 | 11.29 |
| −0.14 + 0.071 | 21.92 | 1.00 | 31.84 |
| −0.071 + 0.040 | 30.49 | 0.40 | 17.61 |
| −0.040 + 0.025 | 21.20 | 0.39 | 11.89 |
| −0.025 + 0 | 21.54 | 0.88 | 27.37 |
| Total | 100.0 | 0.69 | 100.0 |

Granulometric analysis of flotation tailings (shown in Table 2) indicates that, as a result of using the method described herein during kinetic tests, the proportion of gold losses in thin size grades less than −0.025+0 mm decreased from 29.27% to 27.37%. At the same time, redistribution of gold to the size grades of more than 0.14 mm was noted from 5.22% to 11.29% of the product. Losses decreased from 0.81 g/t to 0.69 g/t (by 0.12 g/t).

Experiment 2

Flotation tests (i.e., test 1—basic mode; and test 2—with the method described here, see Table 3 below) on refractory gold-containing ore were carried out in a locked cycle using $Pb(NO_3)_2$, Butyl xanthate, and Flotanol C-7 agents. Roughing and scavenging stages were performed on the Mechanobr Technika FL-240 flotation machine, and cleaning stages were performed on the Mechanobr Technika FL-237 flotation machine. For the basic mode test, aqueous solutions of the $Pb(NO_3)_2$, Butyl xanthate, and Flotanol C-7 agents (i.e., modifiers, collectors, and foaming agents (used in that order)) were fed directly to the Mechanobr Technika FL-240 flotation machine during roughing and scavenging operations, and into the Mechanobr Technica FL-237 flotation machine during cleaning operations. For the test according to the method described herein, the same aqueous solutions of the agents as used for the basic mode test excluding the Flotanol C-7 foaming agent were also fed directly to the Mechanobr Technika FL-240 flotation machine during roughing and scavenging operations, and including the Flotanol C-7 into the Mechanobr Technica FL-237 flotation machine during cleaning operations, and an aqueous solution of Flotanol C-7 was also fed into the mixing chamber of an agitator 100 to generate a flotation mixture containing the following microbubbles stabilized by a surfactant: air microbubbles, emulsion microbubbles, and microdroplets. This flotation mixture was supplied into the Mechanobr Technika FL-240 flotation machine during roughing and scavenging operations. The results are shown in Table 3.

TABLE 3

Results of flotation of refractory gold ore in a locked cycle using $Pb(NO_3)_2$, Butyl xanthate and Flotanol C-7 agents

| Products | Output, % | Content of Au, g/t | Extraction of Au, % | Comments |
|---|---|---|---|---|
| Concentrate | 0.80 | 119 | 52.13 | Basic mode: |
| Tailings | 99.2 | 0.88 | 47.87 | $Pb(NO_3)_2$ - 70 g/t, |
| Feed | 100.0 | 1.82 | 100.0 | Butyl xanthate-150 g/t, Flotanol C-7, 4 g/t |
| Concentrate | 0.91 | 110 | 56.53 | With the method |
| Tailings | 99.09 | 0.78 | 43.47 | described herein: |
| Feed | 100.0 | 1.78 | 100.0 | $Pb(NO_3)_2$ - 70 g/t, Butyl xanthate-150 g/t, Flotanol C-7, 8 g/t |

The test results show that a concentrate with a gold content of 110 g/t (versus 119 g/t in the basic mode) was obtained using the method described herein in a locked cycle with the recovery of 56.53% (versus 52.13% in the basic mode). That is, gold recovery was increased by 4.40%.

Experiment 3

To determine the average size of the microbubbles produced by the agitator 100, a series of photographs were taken using a Phase One XF camera. Based on the pictures, the size of the microbubbles was calculated to be on average less than 50 microns. The aqueous solutions of the following surfactants were passed through the agitator 100 and photographed:

(a) a water-soluble surfactant;

(b) a multicomponent surfactant consisting of water-soluble and oil-soluble component of low molecular weight structure; and (c) a mixture of a water-soluble surfactant, a multicomponent surfactant consisting of water-soluble and oil-soluble component of low molecular weight structure and an oil-soluble surfactant of oligomeric structure.

Summary of Experimental Results

When using the method 300 as described above, the degree of recovery of valuable minerals, the quality of the valuable mineral concentrate, and the velocity of flotation may be increased, as shown in the results of Experiments 1 and 2. As a result of the increased recovery of finely-dispersed mineral particles, which were previously lost in flotation tails using conventional flotation machines, the overall recovery rate of the valuable mineral may be increased as well.

Accordingly, an increase in the efficiency of fine mineral particle recovery may be achieved by:

(a) generation of emulsion microbubbles stabilized by a surfactant with a size smaller than 50 microns, exhibiting simultaneously both foaming and collective properties. The microbubbles may then adhere tightly to the surface of finely dispersed mineral particles and facilitate fixation of other types of microbubbles on their surface;

(b) generation of gas microbubbles stabilized by a surfactant with a size smaller than 50 microns, which may be mineralized by finely dispersed mineral particles;

(c) generation of a microemulsion containing surfactant stabilized droplets of oil-soluble surfactant with a size smaller than 20 microns. The droplets may collide with fine mineral particles and may improve their collective properties; and (d) generation of the microemulsion containing surfactant stabilized droplets of oil-soluble surfactant of oligomeric structure. This microemulsion may also act as a hydrophobic flocculant, leading to aggregation of fine particles and increase in their collision efficiency with gas bubbles, which in turn may intensify flotation.

Further, it has been determined that by changing the formulation of a solution of a multicomponent surfactant and its ratio with gas when supplied to the agitator, it is possible to regulate not only the number and size of microbubbles, but also to obtain small gas bubbles of a cascade structure consisting of several gas microbubbles stabilized by a surfactant. Small gas bubbles of a cascade structure may be transporting bubbles. In contrast to conventional large and medium gas bubbles in the known flotation technology, the cascades of gas microbubbles are much smaller. This allows them to move faster, which intensifies the flotation process.

Further, it has been determined that using the method described herein during scavenging flotation may increase and accelerate the extraction of finely dispersed mineral particles that were not recovered during the roughing flotation stage. Accordingly, the targeted degree of mineral extraction may be achieved with fewer and/or shorter scavenging operations. As a result, by implementing the method described herein, the overall flotation rate may increase due to a decrease in the number of scavenging operations and their duration.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. An agitator for generating a mixture, the agitator comprising:

a housing having a first end and a second end;

an impeller that is coupled to a drive shaft and adapted to be rotated about a rotational axis and mounted within the housing, the impeller having:

a first end with a first end face;

a second end;

a sidewall that axially extends between the first and second ends;

a plurality of protuberances disposed on the first end face, the plurality of protuberances extending outwardly from the first end face substantially parallel to a mixing axis;

a mixing chamber that is located adjacent to the plurality of protuberances; and at least one compressed gas channel outlet on the first end face of the impeller, a fluid inlet disposed at the first end of the housing for supplying a mixing fluid to the mixing chamber;

a fluid outlet disposed at a sidewall of the housing for discharging the mixture from the mixing chamber; and a compressed gas inlet disposed at the sidewall of the housing and extending through the housing; wherein the compressed gas inlet is a spray nozzle extending through the housing and including a plurality of nozzle outlets for discharging compressed gas into the mixing chamber, and there is a gap between the nozzle outlets and the compressed gas channel inlet, wherein the impeller further comprises at least one compressed gas channel connecting the at least one compressed gas channel outlet to a respective one of at least one compressed gas channel inlet along a curved path on the sidewall of the impeller, and the compressed gas inlet is configured for supplying compressed gas to the compressed gas channel inlet of each compressed gas channel.

2. The agitator of claim 1, wherein each compressed gas channel outlet of the at least one compressed gas channel outlet is located radially inward of each protuberance of the plurality of protuberances.

3. The agitator of claim 2, wherein each compressed gas channel outlet of the at least one compressed gas channel outlet is located in a central region on the first end face of the impeller.

4. The agitator of claim 3, wherein the plurality of protuberances is arranged in at least one ring on the first end face.

5. The agitator of claim 4, wherein the fluid inlet is configured to supply the mixing fluid to the central region of the first end face of the impeller.

6. The agitator of claim 5, wherein each compressed gas channel of the at least one compressed gas channel extends from the compressed gas channel inlet to the compressed gas channel outlet along a curved path.

7. The agitator of claim 2, wherein the plurality of protuberances comprises between 30 and 200 protuberances.

8. The agitator of claim 7, wherein the plurality of protuberances is arranged in 4 to 10 concentric rings.

9. The agitator of claim 1, wherein the spray nozzle comprises a non-return valve.

10. The agitator of claim 1, further comprising a motor with the drive shaft and a coupling element that couples the drive shaft to the impeller for rotatably driving the impeller.

11. The agitator of claim 10, further comprising a cooling chamber located intermediate the motor and the housing.

12. The agitator of claim 1, wherein the first end of the housing comprises an inner front face, defining a portion of the mixing chamber, the inner front face comprising a second plurality of protuberances.

13. The agitator of claim 12, wherein the second plurality of protuberances is arranged in concentric rings.

14. The agitator of claim 13, wherein at least a portion of the first end of the housing is removable.

15. A flotation system for separating mineral particles from a flow pulp, the flotation system comprising:

an agitator having:

a housing having a first end and a second end;

an impeller that is coupled to a drive shaft and adapted to be rotated about a rotational axis and mounted within the housing, the impeller having:

a first end with a first end face;

a second end;

a sidewall that axially extends between the first and second ends;

a plurality of protuberances disposed on the first end face, the plurality of protuberances extending outwardly from the first end face substantially parallel to a mixing axis;

a mixing chamber that is located adjacent to the plurality of protuberances; and at least one compressed gas channel outlet on the first end face of the impeller, a fluid inlet disposed at the first end of the housing for supplying a mixing fluid to the mixing chamber;

a fluid outlet disposed at a sidewall of the housing for discharging a flotation mixture from the mixing chamber;

a compressed gas inlet disposed at the sidewall of the housing and extending through the housing, and the compressed gas inlet including a spray nozzle extending through the housing and including a plurality of nozzle outlets for discharging compressed gas into the mixing chamber, and there is a gap between the nozzle outlets and the compressed gas channel inlet;

a flotation chamber; and a conduit connecting the fluid outlet of the agitator to the flotation chamber, wherein the impeller further comprises at least one compressed gas channel connecting the at least one compressed gas channel outlet to a respective one of at least one compressed gas channel inlet along a curved path on the sidewall of the impeller, and the compressed gas inlet is configured for supplying compressed gas to the compressed gas channel inlet of each compressed gas channel.

16. The flotation system of claim 15, wherein the conduit has an inlet disposed upstream of the fluid outlet of the agitator, the inlet being adapted to receive the flow of pulp.

17. A method of producing a flotation mixture having gas microbubbles stabilized by a surfactant, emulsion microbubbles stabilized by a surfactant, and microdroplets stabilized by a surfactant, wherein the method comprises:

providing a solution of a multicomponent surfactant in an agitator for producing the flotation mixture, the agitator comprising:

a housing having a first end and a second end;

an impeller that is coupled to a drive shaft and adapted to be rotated about a rotational axis and mounted within the housing, the impeller having:

a first end with a first end face;

a second end;

a sidewall that axially extends between the first and second ends;

a plurality of protuberances disposed on the first end face, the plurality of protuberances extending outwardly from the first end face substantially parallel to a mixing axis;

a mixing chamber that is located adjacent to the plurality of protuberances; and at least one compressed gas channel outlet on the first end face of the impeller, a fluid inlet disposed at the first end of the housing for supplying a mixing fluid to the mixing chamber;

a fluid outlet disposed at a sidewall of the housing for discharging the mixture from the mixing chamber; and a compressed gas inlet disposed at the sidewall of the housing and extending through the housing; wherein the compressed gas inlet is a spray nozzle extending through the housing and including a plurality of nozzle outlets for discharging compressed gas into the mixing chamber, and there is a gap between the nozzle outlets and the compressed gas channel inlet, wherein the impeller further comprises at least one compressed gas channel connecting the at least one compressed gas channel outlet to a respective one of at least one compressed gas channel inlet along a curved path on the sidewall of the impeller, and the compressed gas inlet is configured for supplying compressed gas to the compressed gas channel inlet of each compressed gas channel;

providing compressed gas to the mixing chamber; and rotating the impeller while the solution of a multicomponent surfactant and the compressed gas are provided, wherein when the compressed gas and the solution are supplied to the mixing chamber, the compressed gas becomes uncompressed gas and rotation of the impeller agitates the uncompressed gas and the solution and disperses the uncompressed gas and at least a portion of the solution to generate the flotation mixture.

18. The method of claim 17, wherein the solution of a multicomponent surfactant and the compressed gas are separately provided to the mixing chamber from opposing directions.

19. The method of claim 17, wherein the method comprises providing each compressed gas channel outlet of the at least one compressed gas channel outlet located radially inward of each protuberance of the plurality of protuberances.

20. The method of claim 19, wherein the method comprises providing each compressed gas channel outlet of the at least one compressed gas channel outlet located in a central region on the first end face of the impeller.

21. The method of claim 20, wherein the method comprises providing the plurality of protuberances arranged in at least one ring on the first end face.

22. The method of claim 21, wherein the method comprises configuring the fluid inlet to supply the mixing fluid to the central region of the first end face of the impeller.

23. The method of claim 22, wherein the method comprises providing each compressed gas channel of the at least one compressed gas channel extending from the compressed gas channel inlet to the compressed gas channel outlet along a curved path.

24. The method of claim 19, wherein the method comprises providing the plurality of protuberances comprises with between 30 and 200 protuberances.

25. The method of claim 24, wherein the method comprises providing the plurality of protuberances arranged in 4 to 10 concentric rings.

26. The method of claim 17, wherein the method comprises providing the spray nozzle with a non-return valve.

27. The method of claim 17, wherein the method further comprises providing a motor with the drive shaft and a coupling element that couples the drive shaft to the impeller for rotatably driving the impeller.

28. The method of claim 27, wherein the method comprises providing a cooling chamber located intermediate the motor and the housing.

29. The method of claim 17, wherein the method comprises providing the first end of the housing comprises with an inner front face, defining a portion of the mixing chamber, the inner front face comprising a second plurality of protuberances.

30. The method of claim 29, wherein the method comprises providing the second plurality of protuberances arranged in concentric rings.

31. The method of claim 30, wherein the method comprises adapting at least a portion of the first end of the housing to be removable.

* * * * *